(12) United States Patent
Dahn et al.

(10) Patent No.: US 7,811,710 B2
(45) Date of Patent: *Oct. 12, 2010

(54) REDOX SHUTTLE FOR RECHARGEABLE LITHIUM-ION CELL

(75) Inventors: Jeffrey R. Dahn, Halifax (CA); Jun Chen, Downers Grove, IL (US); Claudia Buhrmester, Prospect (CA)

(73) Assignee: 3M Innovative Properties Company, St. Paul, MN (US)

(*) Notice: Subject to any disclaimer, the term of this patent is extended or adjusted under 35 U.S.C. 154(b) by 1595 days.

This patent is subject to a terminal disclaimer.

(21) Appl. No.: 11/094,927

(22) Filed: Mar. 31, 2005

(65) Prior Publication Data

US 2005/0221196 A1 Oct. 6, 2005

Related U.S. Application Data

(60) Provisional application No. 60/558,368, filed on Apr. 1, 2004.

(51) Int. Cl.
*H01M 6/04* (2006.01)

(52) U.S. Cl. .................................. 429/324; 429/188

(58) Field of Classification Search .................. None
See application file for complete search history.

(56) References Cited

U.S. PATENT DOCUMENTS

| | | | |
|---|---|---|---|
| 4,857,423 A | 8/1989 | Abraham et al. | |
| 4,869,977 A | 9/1989 | Connolly et al. | |
| 4,888,255 A | 12/1989 | Yoshimitsu et al. | |
| 4,935,316 A | 6/1990 | Redey | |
| 5,278,000 A | 1/1994 | Huang et al. | |
| 5,536,599 A | 7/1996 | Alamgir et al. | |
| 5,709,968 A | 1/1998 | Shimizu | |
| 5,759,714 A | 6/1998 | Matsufuji et al. | |
| 5,763,119 A | 6/1998 | Adachi | |
| 5,858,573 A | 1/1999 | Abraham et al. | |
| 5,879,834 A | 3/1999 | Mao | |
| 5,882,812 A | 3/1999 | Visco et al. | |
| 5,976,731 A | 11/1999 | Negoro et al. | |
| 6,004,698 A | 12/1999 | Richardson et al. | |
| 6,045,952 A | 4/2000 | Kerr et al. | |
| 6,074,776 A | 6/2000 | Mao et al. | |
| 6,074,777 A | 6/2000 | Reimers et al. | |
| 6,203,944 B1 | 3/2001 | Turner et al. | |
| 6,228,516 B1 | 5/2001 | Denton, III et al. | |

(Continued)

FOREIGN PATENT DOCUMENTS

EP 0 759 641 2/1997

(Continued)

OTHER PUBLICATIONS

English translation of JP 03-289062.*

(Continued)

*Primary Examiner*—Patrick Ryan
*Assistant Examiner*—Cynthia Lee
(74) *Attorney, Agent, or Firm*—Stephen F. Wolf

(57) ABSTRACT

A redox chemical shuttle comprising an aromatic compound substituted with at least one tertiary carbon organic group and at least one alkoxy group (for example, 2,5-di-tert-butyl-1,4-dimethoxybenzene) provides repeated overcharge protection in rechargeable lithium-ion cells.

17 Claims, 13 Drawing Sheets

U.S. PATENT DOCUMENTS

| | | |
|---|---|---|
| 6,248,481 B1 | 6/2001 | Visco et al. |
| 6,387,571 B1 | 5/2002 | Lain et al. |
| 6,503,662 B1 | 1/2003 | Hamamoto et al. |
| 6,544,691 B1 | 4/2003 | Guidotti |
| 6,596,439 B1 | 7/2003 | Tsukamoto et al. |
| 7,074,523 B2 | 7/2006 | Arai et al. |
| 7,294,436 B2 | 11/2007 | Abe et al. |
| 2001/0004507 A1 | 6/2001 | Gan et al. |
| 2002/0001756 A1 | 1/2002 | Hamamoto et al. |
| 2003/0068561 A1 | 4/2003 | Okahara et al. |
| 2003/0099886 A1 | 5/2003 | Choy et al. |
| 2003/0129499 A1 | 7/2003 | Choy et al. |
| 2004/0028996 A1 | 2/2004 | Hamamoto et al. |
| 2004/0096743 A1* | 5/2004 | Okae et al. ............... 429/231.1 |
| 2004/0121239 A1 | 6/2004 | Abe et al. |
| 2004/0197664 A1 | 10/2004 | Iriyama et al. |
| 2005/0042519 A1 | 2/2005 | Roh et al. |
| 2005/0221168 A1 | 10/2005 | Dahn et al. |
| 2005/0221196 A1 | 10/2005 | Dahn et al. |
| 2006/0263695 A1 | 11/2006 | Dahn et al. |
| 2006/0263697 A1 | 11/2006 | Dahn et al. |
| 2007/0020522 A1 | 1/2007 | Obrovac et al. |
| 2007/0020528 A1 | 1/2007 | Obrovac et al. |
| 2008/0050658 A1 | 2/2008 | Abe et al. |

FOREIGN PATENT DOCUMENTS

| | | |
|---|---|---|
| EP | 0 776 058 | 5/1997 |
| EP | 0 825 663 | 2/1998 |
| EP | 1 160 905 A2 | 12/2001 |
| EP | 1 361 622 A1 | 11/2003 |
| GB | 1 066 928 | 4/1967 |
| JP | 61-279061 | 12/1986 |
| JP | 62-82649 | 4/1987 |
| JP | 63-55861 | 3/1988 |
| JP | 63-55868 | 3/1988 |
| JP | 03-289062 | * 12/1991 |
| JP | 05-036439 | 2/1993 |
| JP | 05-041251 | 2/1993 |
| JP | 5-258771 | 8/1993 |
| JP | 05-295058 | 11/1993 |
| JP | 6-338347 | 6/1994 |
| JP | 07-302614 | 11/1995 |
| JP | 8-115745 | 5/1996 |
| JP | 09-050822 | 2/1997 |
| JP | 10-050342 | 2/1998 |
| JP | 10-321258 | 12/1998 |
| JP | 2000-058116 | 2/2000 |
| JP | 2000-058117 | 2/2000 |
| JP | 2000-156243 | 6/2000 |
| JP | 2000-228215 | 8/2000 |
| JP | 2000-251932 | 9/2000 |
| JP | 2000-277147 | 10/2000 |
| JP | 2000-348725 | 12/2000 |
| JP | 2001-015156 | 1/2001 |
| JP | 2001-023687 | 1/2001 |
| JP | 2001-196061 | 7/2001 |
| JP | 2001-210364 | 8/2001 |
| JP | 2004-6400 | 1/2004 |
| JP | 2006/073241 | 3/2006 |
| WO | WO 00/03444 | 1/2000 |
| WO | WO 01/29920 | 4/2001 |
| WO | WO 03/081697 | 10/2003 |

OTHER PUBLICATIONS

Balakrishnan, P.G., et al., "Safety Mechanisms in Lithium-Ion Batteries," *Journal of Power Sources*, vol. 155, No. 2, (Apr. 21, 2006), pp. 401-414.

Buhrmester et al., "Phenothiazine Molecules—Possible Redox Shuttle Additives for Chemical Overcharge and Overdischarge Protection for Lithium-Ion Batteries", *J. Electrochem. Soc.*, vol. 153, No. 2, (2006), pp. A288-A294.

Burdon et al., "Aromatic Polyfluoro-compounds. Part XIX.[1] The Preparation of Some Polyfluorodi- and Polyfluorotri-phenylamines." *J. Chem. Soc.* (1964), pp. 5017-5021.

Dapperheld et al., "Substituted Triarylamine Cation-Radical Redox Systems—Synthesis, Electrochemical and Spectroscopic Properties, Hammet Behavior, and Suitability as Redox Catalysts", *Chem. Ber.*, vol. 124 (1991), pp. 2557-2567.

Miller et al., "Reactions of polyfluoroarenes with hexamethyldisilazane and with 1,1,1-trimethyl-N,N-bis(trimethylsilyl) stannaneamine in the presence of caesium fluoride", *J. of Fluorine Chemistry*, vol. 75, (1995), pp. 169-172.

Schmidt et al., "Elektrochemische und spektroskopische Untersuchung bromsubstituierter Triarylamin-Redoxsysteme", *Chem. Ber.*, vol. 113 (1980), pp. 577-585.

Wang et al., "Calculations of Oxidation Potentials of Redox Shuttle Additives for Li-Ion Cells", *J. of Electrochem. Soc.*, vol. 153, No. 2, (2006), pp. A445-A449.

Walter, "Triarylaminium Salt Free Radicals", *J. Am. Chem. Soc.*, vol. 77 (1955), pp. 5999-6002.

K.M. Abraham et al., *J. Electrochem. Soc.*, 137, 1856 (1988).

K. M. Colbow et al., *J. Power Sources* 26, 397-402 (1989).

S. R. Narayanan et al., *J. Electrochem. Soc.*, 138, 2224 (1991).

M. N. Golovin et al., *J. Electrochem. Soc.*, 139, 5 (1992).

A. M. Wilson et al., *J. Electrochem. Soc.*, 142, 326-332 (1995).

T.J. Richardson et al., *J. Electrochem. Soc.*, 143, 3992-96 (1996).

M. Adachi et al., *J. Electrochem. Soc.* 146, 1256 (1999).

T. D. Hatchard et al., *Electrochemical and Solid-State Letters*, 3 (7) 305-308 (2000).

D. D. MacNeil et al., A DSC Comparison of Various Cathodes for Li-ion Batteries, *J. Power Sources*, 108 (1-2): 8-14 (2002).

Xu et al., *Electrochemical and Solid-State Letters*, 5 (11) A259-A262 (2002).

Xu et al., *Electrochemical and Solid-State Letters*, 6 (6) A117-A120 (2003).

Lee et al., *Korean J. Chem. Eng.*, 19(4) 645-652 (2002).

Amatore et al., *Journal of Electroanalytical Chemistry* 462 55-62 (1999).

Sun et al., *J. Am. Chem. Soc.* 126 1388-1401 (2004).

Johnston et al., *Langmuir* 7 289-296 (1991).

* cited by examiner

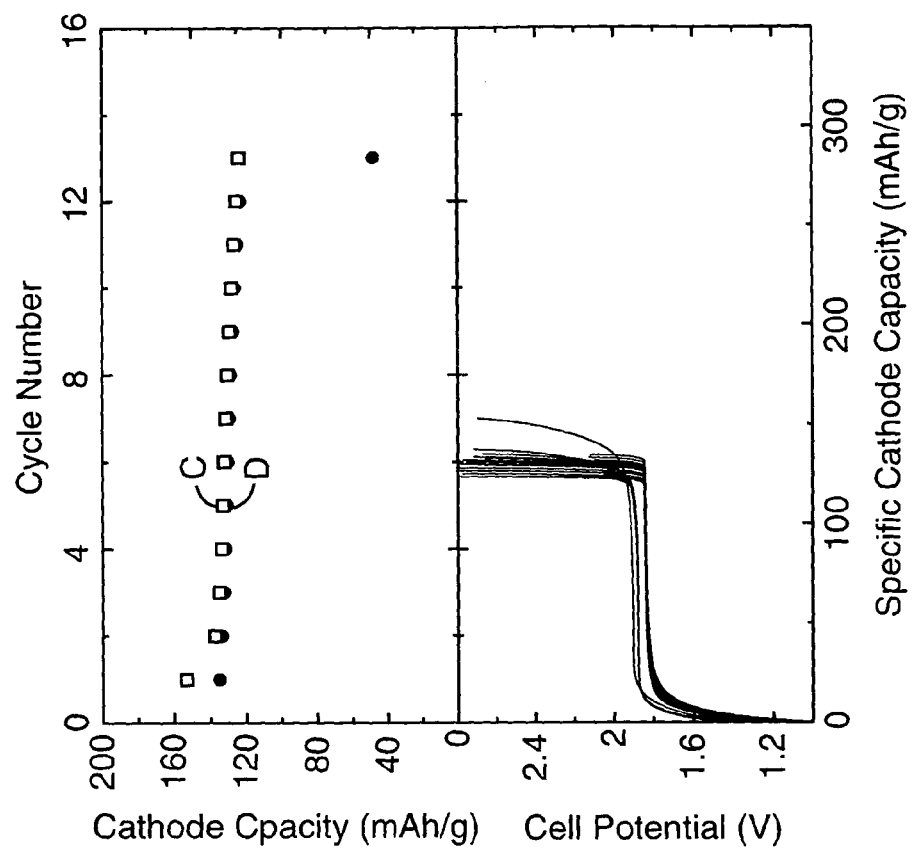
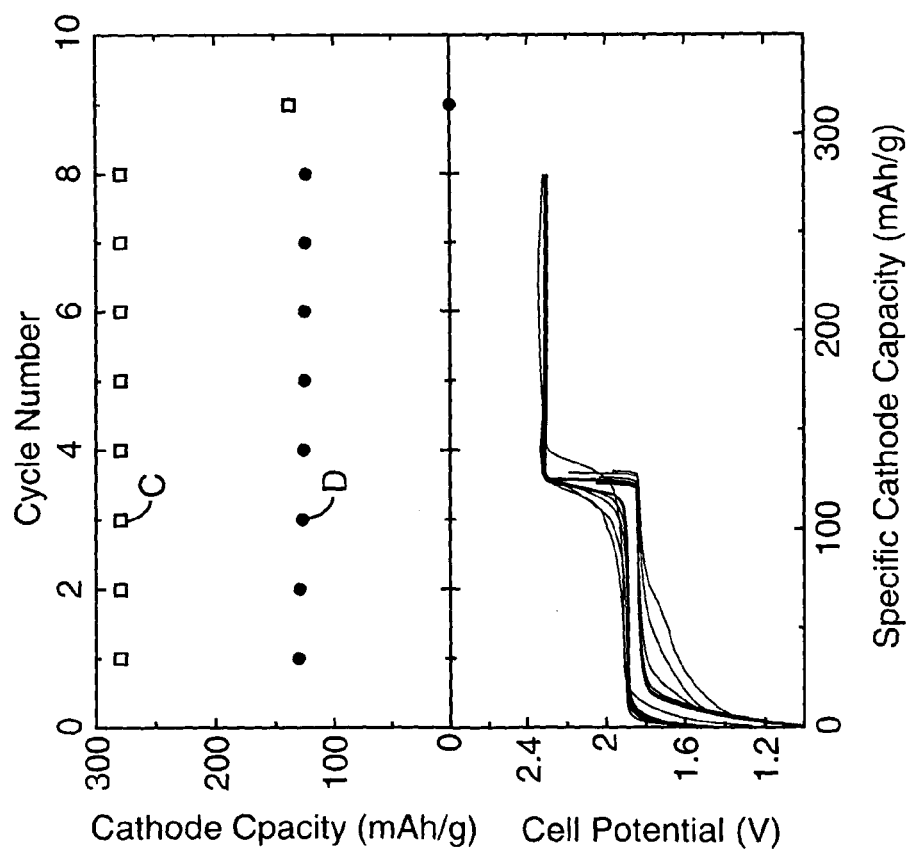
*Fig. 3b*
*Fig. 3a*

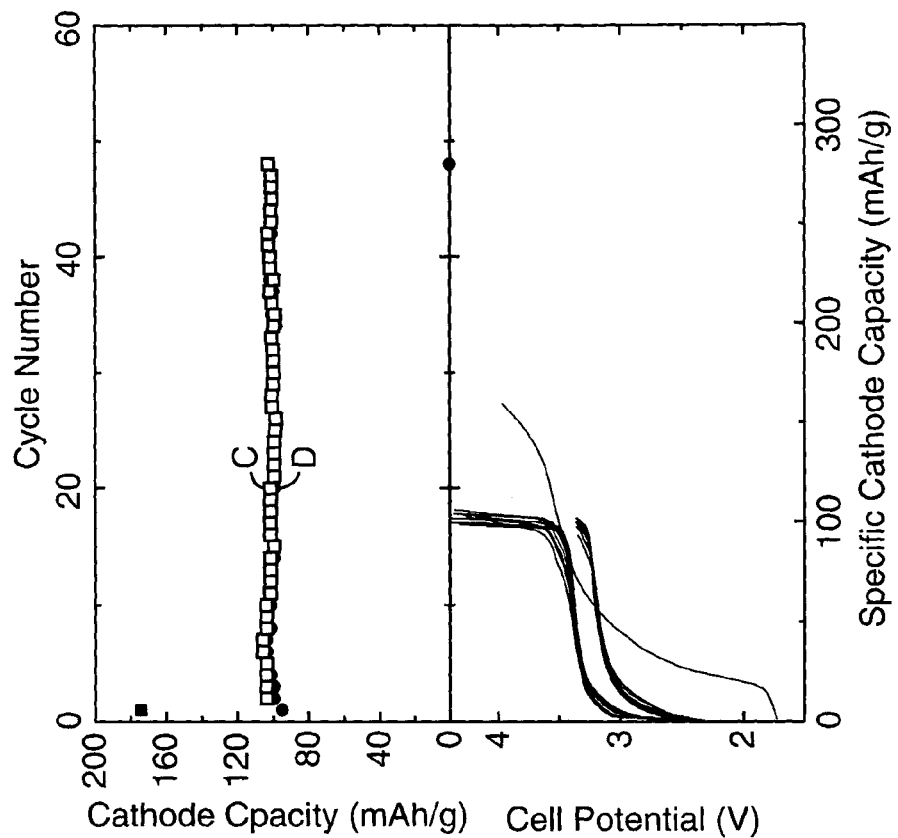
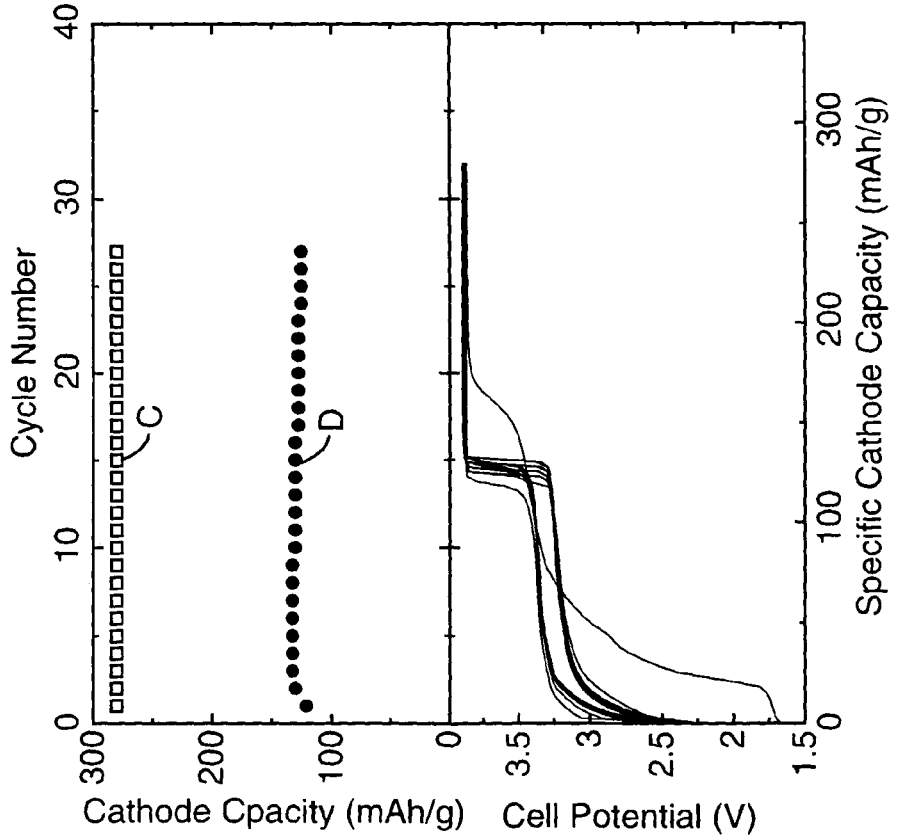
Fig. 4b
Fig. 4a

REDOX SHUTTLE FOR RECHARGEABLE LITHIUM-ION CELL

CROSS-REFERENCE TO RELATED APPLICATION

This application claims the benefit of the filing date of Provisional Application No. 60/558,368 filed Apr. 1, 2004, the disclosure of which is incorporated herein by reference.

FIELD OF THE INVENTION

This invention relates to overcharge protection in rechargeable lithium-ion cells.

BACKGROUND

When properly designed and constructed, lithium-ion cells can exhibit excellent charge-discharge cycle life, little or no memory effect, and high specific and volumetric energy. However, lithium-ion cells do have some shortcomings, including an inability to tolerate recharge to potentials above the manufacturer's recommended recharge potential without degradation in cycle life, dangers of overheating, fire or explosion for cells recharged to potentials above the recommended recharge potential, and difficulties in making large cells having sufficient tolerance to electrical and mechanical abuse for consumer applications. Single and connected (e.g., series-connected) lithium-ion cells typically incorporate charge control electronics to prevent individual cells from exceeding the recommended recharge potential. This circuitry adds cost and complexity to lithium-ion cells and batteries, which has discouraged their use in low-cost mass market electrical and electronic devices such as flashlights, radios, CD players and the like. Instead, these low cost devices typically are powered by non-rechargeable batteries such as alkaline cells.

Various chemical moieties have been proposed for imparting overcharge protection to rechargeable lithium-ion cells. Chemical moieties designated as "redox shuttles" or "shuttles" will in theory provide an oxidizable and reducible charge-transporting species that may repeatedly transport charge between the negative and positive electrodes once the charging potential reaches a desired value. Materials that function as fuses or shunts to provide one-time or limited-time cell overcharge protection have also been proposed. References relating to rechargeable lithium-ion cell additives or rechargeable lithium-ion cell construction include U.S. Pat. No. 4,857,423 (Abraham et al. '423), U.S. Pat. No. 4,888,255 (Yoshimitsu et al.), U.S. Pat. No. 4,935,316 (Redey), U.S. Pat. No. 5,278,000 (Huang et al.), U.S. Pat. No. 5,536,599 (Alamgir et al.), U.S. Pat. No. 5,709,968 (Shimizu), U.S. Pat. No. 5,763,119 (Adachi), U.S. Pat. No. 5,858,573 (Abraham et al. '573), U.S. Pat. No. 5,879,834 (Mao), U.S. Pat. No. 5,882,812 (Visco et al. '812), U.S. Pat. No. 6,004,698 (Richardson et al. '698), U.S. Pat. No. 6,045,952 (Kerr et al.), U.S. Pat. No. 6,074,776 (Mao et al.), U.S. Pat. No. 6,074,777 (Reimers et al.), U.S. Pat. No. 6,228,516 B1 (Denton, III et al.), U.S. Pat. No. 6,248,481 B1 (Visco et al. '481), U.S. Pat. No. 6,387,571 B1 (Lain et al.), U.S. Pat. No. 6,596,439 B1 (Tsukamoto et al.) and U.S. Pat. No. 6,503,662 B1 (Hamamoto et al.); U.S. Patent Application Publication Nos. US 2002/0001756 A1 (Hamamoto et al. '756), US 2003/0068561 A1 (Okahara et al.), US 2004/0028996 A1 (Hamamoto et al. '996) and US 2004/0121239 A1 (Abe et al.); European Patent No. EP 0 776 058 B1 (Moli Energy (1990) Ltd.); Japanese Published Patent Application Nos. 4-055585 (Fuji Electro Chemical Co. Ltd.), 5-036439 (Sony Corp.), 5-258771 (Fuji Denko, Co. Ltd.), 6-338347 (Sony Corp.), 7-302614 (Sony Corp.), 8-115745 (Japan Storage Battery Co., Ltd.), 9-050822 (Sony Corp.), 10-050342 (Sony Corp.), 10-321258 (NEC Moli Energy Canada, Ltd.), 2000-058116 (Sanyo Electric Co. Ltd.), 2000-058117 (Sanyo Electric Co. Ltd.), 2000-156243 (Sony Corp.), 2000-228215 (Sanyo Electric Co. Ltd.), 2000-251932 (Sony Corp.), 2000-277147 (Sony Corp.) and 2001-2103645 (Mitsubishi Chemicals Corp.); PCT Published Patent Application Nos. WO 01/29920 A1 (Richardson et al. '920) and WO 03/081697 A1 (Goh et al.); K. M. Abraham et al., *J. Electrochem. Soc.*, 137, 1856 (1988); L. Redey, The Electrochemical Society Fall Meeting, Chicago, Ill., *Extended Abstracts*, 88-2 (Oct. 9-14, 1988); K. M. Colbow et al., *J. Power Sources* 26, 397-402 (1989); S. R. Narayanan et al., *J. Electrochem. Soc.*, 138, 2224 (1991); M. N. Golovin et al., *J. Electrochem. Soc.*, 139, 5 (1992); NTIS Funding Report No. 17908, Optimization of Electrolyte Batteries, Principal Investigator K. M. Abraham, Eic Laboratory, Inc., (1992); A. M. Wilson et al., *J. Electrochem. Soc.*, 142, 326-332 (1995); T. J. Richardson et al., *J. Electrochem. Soc.*, 143, 3992-96 (1996); "NEW TECHNOLOGY: Rechargeable Cell Overcharge Protection", *Battery & EV Technology*, 21, 3 (Feb. 1, 1997); M. Adachi et al., *J. Electrochem. Soc.* 146, 1256 (1999); T. D. Hatchard et al., *Electrochemical and Solid-State Letters*, 3 (7) 305-308 (2000), D. D. MacNeil et al., A DSC Comparison of Various Cathodes for Li-ion Batteries, *J. Power Sources*, 108 (1-2): 8-14 (2002), D. Y. Lee et al., *Korean Journal of Chemical Engineering*, 19, 645 (2002), Xu et al., *Electrochemical and Solid-State Letters*, 5 (11) A259-A262 (2002) and Xu et al., *Electrochemical and Solid-State Letters*, 6 (6) A117-A120 (2003).

SUMMARY OF THE INVENTION

Evaluation of some of the redox shuttles that have been proposed shows that when subjected to repeated overcharge conditions they may degrade or otherwise lose their effectiveness and thus may offer inadequate repeated overcharge protection. Also, some proposed redox shuttles have oxidation potentials best suited to particular lithium-ion cell chemistries, but poorly suited for use with other lithium-ion cell chemistries.

The invention provides, in one aspect, a lithium ion battery electrolyte comprising a charge carrying medium, lithium salt and cyclable redox chemical shuttle comprising an aromatic compound substituted with at least one tertiary carbon organic group and at least one alkoxy group.

The invention provides, in another aspect, a rechargeable lithium-ion cell comprising a negative electrode; positive electrode; and an electrolyte comprising charge carrying medium, lithium salt and cyclable redox chemical shuttle comprising an aromatic compound substituted with at least one tertiary carbon organic group and at least one alkoxy group and having an electrochemical potential vs. $Li/Li^+$ that is greater than that of the positive electrode material.

Exemplary embodiments of the recited redox chemical shuttle have displayed excellent repeated overcharge stability. Redox chemical shuttle embodiments having a potential from about 3.7 to about 4.0 V vs. $Li/Li^+$ are especially well-suited for use in rechargeable cells based on $LiFePO_4$ positive electrodes. Thus the invention provides, in yet another aspect, a rechargeable lithium-ion cell comprising a negative electrode, positive electrode comprising $LiFePO_4$, electrolyte and a cyclable redox chemical shuttle comprising an aromatic compound substituted with at least one tertiary carbon organic group and at least one alkoxy group and having an electrochemical potential vs. Li/Li$^+$ that is greater than that of LiFePO$_4$.

These and other aspects of the invention will be apparent from the detailed description below. In no event, however, should the above summaries be construed as limitations on the claimed subject matter, which subject matter is defined solely by the attached claims, as may be amended during prosecution.

BRIEF DESCRIPTION OF THE DRAWING

FIG. 3a is a plot showing capacity versus cycle number and cell potential versus cathode specific capacity for the Example 3 cell.

FIG. 3b is a plot showing capacity versus cycle number and cell potential versus cathode specific capacity for the Comparison Example 3 cell.

FIG. 4a is a plot showing capacity versus cycle number and cell potential versus cathode specific capacity for the Example 4 cell.

FIG. 4b is a plot showing capacity versus cycle number and cell potential versus cathode specific capacity for the Comparison Example 4 cell.

Like reference symbols in the various drawings indicate like elements. The elements in the drawing are not to scale.

DETAILED DESCRIPTION

Figure 1B:
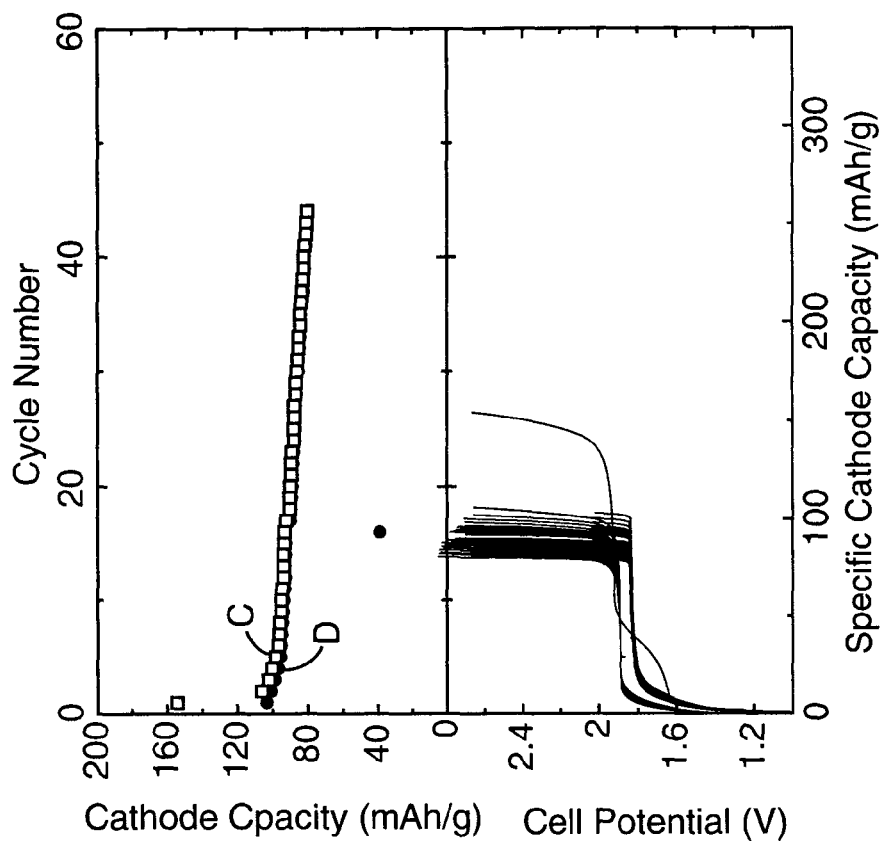
FIG. 1b is a plot showing capacity versus cycle number and cell potential versus cathode specific capacity for the Comparison Example 1 cell.

The phrase "negative electrode" refers to one of a pair of rechargeable lithium-ion cell electrodes that under normal circumstances and when the cell is fully-charged will have the lowest potential. We retain this terminology to refer to the same physical electrode under all cell operating conditions even if such electrode is temporarily (e.g., due to cell overdischarge) driven to or exhibits a potential above that of the other (the positive) electrode.

The phrase "positive electrode" refers to one of a pair of rechargeable lithium-ion cell electrodes that under normal circumstances and when the cell is fully-charged will have the highest potential. We retain this terminology to refer to the same physical electrode under all cell operating conditions even if such electrode temporarily (e.g., due to cell overdischarge) is driven to or exhibits a potential below that of the other (the negative) electrode.

The phrase "redox chemical shuttle" refers to an electrochemically reversible moiety that during charging of a lithium-ion cell can become oxidized at the cell's positive electrode, migrate to the cell's negative electrode, become reduced at the negative electrode to reform the unoxidized (or less-oxidized) shuttle species, and migrate back to the positive electrode.

The word "cyclable" when used in connection with a redox chemical shuttle refers to a shuttle that when exposed to a charging voltage sufficient to oxidize the shuttle to its radical cation and an overcharge charge flow equivalent to 100% of the cell capacity will provide at least two cycles of overcharge protection.

The phrase "substituted with at least one tertiary carbon organic group" refers to an aromatic compound having a ring atom bonded to the organic group through its tertiary carbon atom (viz., through a carbon atom bonded to three other carbon atoms). The tertiary carbon organic group may for example have the formula —CR$_3$ where R is an alkyl group having up to 10 carbon atoms, up to 6 carbon atoms, up to 4 carbon atoms, up to 3 carbon atoms, up to 2 carbon atoms or 1 carbon atom.

The phrase "substituted . . . with at least one alkoxy group" refers to an aromatic compound having a ring atom bonded to the alkoxy group through its oxygen atom. The alkoxy group may for example have the formula —OR' where R' is an alkyl group having up to 10 carbon atoms, up to 6 carbon atoms, up to 4 carbon atoms, up to 3 carbon atoms, up to 2 carbon atoms or 1 carbon atoms.

According to the literature (Richardson et al., *J. Electrochem. Soc.* Vol. 143, 3992 (1996)) the maximum shuttle current for a singly ionized shuttle is given by $$I_{max} = FAD\,C/d, \qquad [1]$$

where F is Faraday's number, A is the electrode area, D is an effective diffusion constant of the shuttle species (taking into account both oxidized and reduced forms of the shuttle), C is the total concentration of the shuttle species and d is the distance between the electrodes. To obtain a large shuttle current, the electrolyte should impart a large diffusion constant, D, to the shuttle and support a high shuttle concentration, C. The shuttle diffusion constant usually will increase as the electrolyte solution viscosity decreases. A variety of charge carrying media may be employed in the electrolyte. Exemplary media are liquids or gels capable of solubilizing sufficient quantities of the lithium salt and the redox chemical shuttle so that a suitable quantity of charge can be transported from the positive electrode to negative electrode. Exemplary charge carrying media can be used over a wide temperature range, e.g., from about −30° C. to about 70° C. without freezing or boiling, and are stable in the electrochemical window within which the cell electrodes and shuttle operate. Representative charge carrying media include ethylene carbonate, propylene carbonate, dimethyl carbonate, diethyl carbonate, ethyl-methyl carbonate, butylene carbonate, vinylene carbonate, fluoroethylene carbonate, fluoropropylene carbonate, γ-butylrolactone, methyl difluoroacetate, ethyl difluoroacetate, dimethoxyethane, diglyme(bis(2-methoxyethyl)ether) and combinations thereof.

A variety of lithium salts may be employed in the electrolyte. Exemplary lithium salts are stable and soluble in the chosen charge-carrying media and perform well in the chosen lithium-ion cell, and include $LiPF_6$, $LiBF_4$, $LiClO_4$, lithium bis(oxalato)borate (LiBOB), $LiN(CF_3SO_2)_2$, $LiN(C_2F_5SO_2)_2$, $LiAsF_6LiC(CF_3SO_2)_3$ and combinations thereof.

A variety of redox chemical shuttles may be employed in the electrolyte. Exemplary shuttles have a redox potential slightly higher than the cell's desired recharge potential. As a general numeric guide, the shuttle may for example have a redox potential about 0.3 to about 0.6 V above the positive electrode recharge plateau, e.g., about 3.7 to about 4.7 V vs. Li/Li+, about 3.7 to about 4.4 V vs. Li/Li+, about 3.7 to about 4.2 V vs. Li/Li+, or about 3.7 to about 4.0 V vs. Li/Li+. For example, $LiFePO_4$ positive electrodes have a recharge plateau around 3.45V vs. Li/Li$^+$, and exemplary shuttles for use with such electrodes may have a redox potential from about 3.75 to about 4.05 V vs. Li/Li$^+$. Similarly, $LiMnPO_4$ and $LiMn_2O_4$ electrodes have a recharge plateau around 4.1 V vs. Li/Li$^+$, and exemplary shuttles for use with such electrodes may have a redox potential from about 4.4 to about 4.7 V vs. Li/Li$^+$. If an attempt is made to charge the cell above the shuttle's redox potential, the oxidized shuttle molecules carry a charge quantity corresponding to the applied charging current to the negative electrode, thus preventing cell overcharge. Especially preferred shuttles are sufficiently cyclable to provide at least 10, at least 15, at least 20, at least 35, at least 50 or at least 100 cycles of overcharge protection at a charging voltage sufficient to oxidize the shuttle to its radical cation and an overcharge charge flow equivalent to 100% of the cell capacity during each cycle.

The shuttle contains an aromatic compound substituted with at least one tertiary carbon organic group and at least one alkoxy group. As mentioned above, the tertiary carbon organic group may have the formula —$CR_3$ where each R group independently has up to 10, up to 6, up to 4, up to 2, or 1 carbon atom. Exemplary tertiary carbon organic groups may for example have up to 12, up to 10, up to 8, up to 6, 5, or 4 carbon atoms. Some shuttles may contain two or at least two tertiary carbon organic groups which may be the same or different. If located on the same aromatic ring (e.g., a benzene ring), the tertiary carbon organic groups may for example be oriented ortho, meta or para to one another.

As mentioned above, the alkoxy group may have the formula —OR' where R' is an alkyl group having up to 10, up to 6, up to 4, up to 3, up to 2, or 1 carbon atom. Exemplary alkoxy groups may for example have 1 to 10, 1 to 6, 2 to 6, 1 to 4, 1 to 3 or 1 carbon atom. Some shuttles may contain two or at least two alkoxy groups which may be the same or different. If located on the same aromatic ring the alkoxy groups may for example be oriented ortho, meta or para to one another.

Exemplary shuttles may for example contain 1 to 3 aromatic rings that are fused or connected. Each aromatic ring may for example be carbocyclic. Examples of such aromatic rings include benzene, naphthalene, anthracene, biphenyl, and the like.

Other substituents may be present on the shuttle aromatic ring or rings or on the tertiary carbon organic group(s) or alkoxy group(s), so long as such substituents do not unduly interfere with factors such as the shuttle's charge-carrying capability, oxidation potential or stability. The presence or absence of such substituents, and the relative orientation of the tertiary carbon organic group(s) and alkoxy group(s), may affect such factors. For example, electron withdrawing groups may raise the shuttle oxidation potential and electron donating groups may lower it. Without being bound by theory, substituents such as halogen atoms (e.g., chlorine atoms), amino groups, primary carbon organic groups (e.g., methyl groups), secondary carbon organic groups (e.g., isopropyl groups) or readily-polymerizable groups (e.g., allyl groups) may in some embodiments reduce stability and thus it may be desirable for the shuttle to be free or substantially free of any or all such substituents. Again without being bound by theory, substituents that are less bulky than a tertiary carbon organic group and which can replace a ring hydrogen atom with a moiety having reduced reactivity under the cell operating conditions (e.g., nitro groups, cyano groups, alkyl ester groups, or other known electron-withdrawing groups) may in some embodiments increase stability, and thus it may be helpful to employ shuttles with four or fewer, three or fewer, two or fewer, one or no available ring hydrogen atoms and with the remaining ring positions being occupied by one or more such substituents and by the tertiary carbon organic group or groups and the alkoxy group or groups. Again without being bound by theory, when a tertiary carbon organic group and an alkoxy group are oriented ortho to one another on an aromatic ring, then in some embodiments it may be desirable for the other ring atom ortho to the alkoxy group to be unsubstituted or substituted with a substituent that is less bulky than a tertiary carbon organic group. The shuttle may also be in the form of a salt.

Representative shuttles include substituted anisoles (or methoxybenzenes) such as 2-tert-butyl-anisole, 3-tert-butyl-anisole, 4-tert-butyl-anisole, 1-nitro-3-tert-butyl-2-methoxybenzene, 1-cyano-3-tert-butyl-2-methoxybenzene, 1,4-di-tert-butyl-2-methoxybenzene, 5-tert-butyl-1,3-dinitro-2-methoxybenzene, 1,3,5-tri-tert-butyl-2-methoxybenzene and 2-tert-pentyl-anisole; substituted dialkoxybenzenes such as 2-tert-butyl-1,4-dimethoxybenzene, 2,3-di-tert-butyl-1,4-dimethoxybenzene, 2,5-di-tert-butyl-1,4-dimethoxybenzene, 2,5-di-tert-pentyl-1,4-dimethoxybenzene, 2,5-di-tert-butyl-3,6-di-nitro-1,4-dimethoxybenzene, 2,5-di-tert-butyl-3,6-di-cyano-1,4-dimethoxybenzene, 2,5-di-tert-butyl-1,4-diethoxybenzene, 4-tert-butyl-1,2-dimethoxybenzene, 4,5-di-tert-butyl-1,2-dimethoxybenzene, 4,5-di-tert-pentyl-1,2-dimethoxybenzene and 4,5-di-tert-butyl-1,2-diethoxybenzene; and substituted alkoxynaphthalenes such as 4,8-di-tert-butyl-1,5-dimethoxynaphthalene.

Mixtures of two or more shuttles having different electrochemical potentials vs. Li/Li$^+$ may also be employed. For example, a first shuttle operative at 3.8V and a second shuttle operative at 3.9V may both be employed in a single cell. If after many charge/discharge cycles the first shuttle degrades and loses its effectiveness, the second shuttle (which would not meanwhile have been oxidized to form its radical cation while the first shuttle was operative) could take over and provide a further (albeit higher potential) margin of safety against overcharge damage.

The shuttle can also provide overdischarge protection to a cell or to a battery of series-connected cells, as described further in U.S. Pat. Publ. No. 2005/0221168 A1 (Dahn et al.) and entitled "REDOX SHUTTLE FOR OVERDISCHARGE PROTECTION IN RECHARGEABLE LITHIUM-ION BATTERIES", the disclosure of which is incorporated herein by reference.

The shuttle electrolyte solubility may be improved through addition of a suitable cosolvent. Exemplary cosolvents include aromatic materials compatible with Li-ion cells containing cyclic ester-based electrolytes. Representative cosolvents include toluene, sulfolane, dimethoxyethane and combinations thereof. The electrolyte may include other additives that will be familiar to those skilled in the art.

A variety of negative and positive electrodes may be employed in lithium-ion cells of the invention. Representative negative electrodes include $Li_{4/3}Ti_{5/3}O_4$; the lithium alloy compositions described in U.S. Pat. Nos. 6,203,944 (Turner '944), 6,255,017 (Turner '017), 6,436,578 (Turner et al. '578), 6,664,004 (Krause et al. '004) and 6,699,336 (Turner et al. '336); U.S. Patent Application Publication Nos. 2003/0211390 A1 (Dahn et al. '390), U.S. Pat. Nos. 6,699,336; 6,664,004 (both Turner et al.) and 7,498,100 (Turner et al.); graphitic carbons e.g., those having a spacing between (002) crystallographic planes, $d_{002}$, of 3.45 Å>$d_{002}$>3.354 Å and existing in forms such as powders, flakes, fibers or spheres (e.g., mesocarbon microbeads); other materials that will be familiar to those skilled in the art; and combinations thereof. Representative positive electrodes include $LiFePO_4$, $LiMnPO_4$, $LiMn_2O_4$, $LiCoPO_4$, and $LiCoO_2$; lithium transition metal oxides as disclosed in U.S. Pat. Nos. 5,858,324 (Dahn et al. '324), 5,900,385 (Dahn et al. '385), 6,143,268 (Dahn et al. '268) and 6,680,145 (Obrovac et al. '145); U.S. Patent Application Publication No. 2004/0121234 A1 (Le) and U.S. Pat. Nos. 7,556,655 (Dahn et al.), 7,211,237 (Eberman et al.), 6,964,828 and 7,078,128 (both Lu et al.); combinations thereof and other materials that will be familiar to those skilled in the art. In some embodiments, it may be desirable that the positive electrode has a recharge plateau around 3.45V vs. $Li/Li^+$ such as $LiFePO_4$ or around 4.1V vs. $Li/Li^+$ such as $LiMnPO_4$ or $LiMn_2O_4$. The negative or positive electrode may contain additives such as will be familiar to those skilled in the art, e.g., carbon black for negative electrodes and carbon black, flake graphite and the like for positive electrodes.

The disclosed cells may be used in a variety of devices, including portable computers, tablet displays, personal digital assistants, mobile telephones, motorized devices (e.g, personal or household appliances and vehicles), instruments, illumination devices (e.g., flashlights) and heating devices. The disclosed cells may have particular utility in low-cost mass market electrical and electronic devices such as flashlights, radios, CD players and the like, which heretofore have usually been powered by non-rechargeable batteries such as alkaline cells. Further details regarding use of the electrolyte and construction and use of rechargeable lithium-ion cells will be familiar to those skilled in the art.

The invention is further illustrated in the following illustrative examples, in which all parts and percentages are by weight unless otherwise indicated.

Examples 1-6 and Comparison Examples 1-4

Negative electrodes were made from $Li_{4/3}Ti_{5/3}O_4$ (synthesized according to the procedure shown in K. M. Colbow, R. R. Haering and J. R. Dahn, "Structure and Electrochemistry of the Spinel Oxides $LiTi_2O_4$ and $Li_{4/3}Ti_{5/3}O_4$", J. Power Sources, 26, 397-402 (1989)) or from mesocarbon microbeads ("MCMB", a graphitic carbon with 3.45>$d_{002}$>3.354 Å, obtained from E-One/Moli Energy Canada, Maple Ridge, B.C., Canada) using the following procedure. 100 Parts of the negative electrode active material (viz., $Li_{4/3}Ti_{5/3}O_4$ or MCMB), 5 parts KYNAR™ 301P polyvinylidene fluoride (commercially available from Atofina Chemicals, Philadelphia, Pa.) and 5 parts SUPER S™ Carbon Black (commercially available from MMM Carbon, Tertre, Belgium) were mixed with N-methylpyrrolidinone to form a slurry. After extensive mixing in a polyethylene bottle containing spheres of ZIRCOA™ 6.35 mm diameter zirconium oxide banded satellite spherical media (commercially available from Zircoa, Inc., Solon, Ohio), the slurry was coated in a thin film on a copper foil current collector. The resulting coated electrode foil was dried in air overnight at 90° C. Individual 1.3 cm diameter electrode discs were cut from the electrode foil using a precision punch. Positive electrodes were made the same way using $LiFePO_4$ (commercially available from Phostech Lithium, Ste-Foy, Quebec, Canada) as the active material, except that the coatings were applied to aluminum foil.

Electrolytes were prepared by mixing together the ingredients shown in Table 1, using lithium salts selected from lithium bisoxalatoborate ("LiBOB", commercially available from Chemetall Group of Dynamit Nobel AG, Troisdorf, Germany) and $LiPF_6$ (manufactured by Stella Chemifa Corp., Japan and obtained from E-One/Moli Energy). The electrolytes also contained charge carrying media selected from ethylene carbonate ("EC", obtained from E-One/Moli Energy), propylene carbonate ("PC", obtained from E-One/Moli Energy), diethyl carbonate ("DEC", obtained from E-One/Moli Energy) and dimethyl carbonate ("DMC", obtained from E-One/Moli Energy). Electrolyte C additionally contained toluene (commercially available from Aldrich Chemical Co., Milwaukee, Wis.) as a solubilizing aid. Varying quantities of the cyclable redox chemical shuttle 2,5-di-tert-butyl-1,4-dimethoxybenzene (CAS No. 7323-63-9, commercially available from Aldrich Chemical Co., Milwaukee, Wis. as Catalog No. S661066) were optionally added to each electrolyte.

Figure 9:
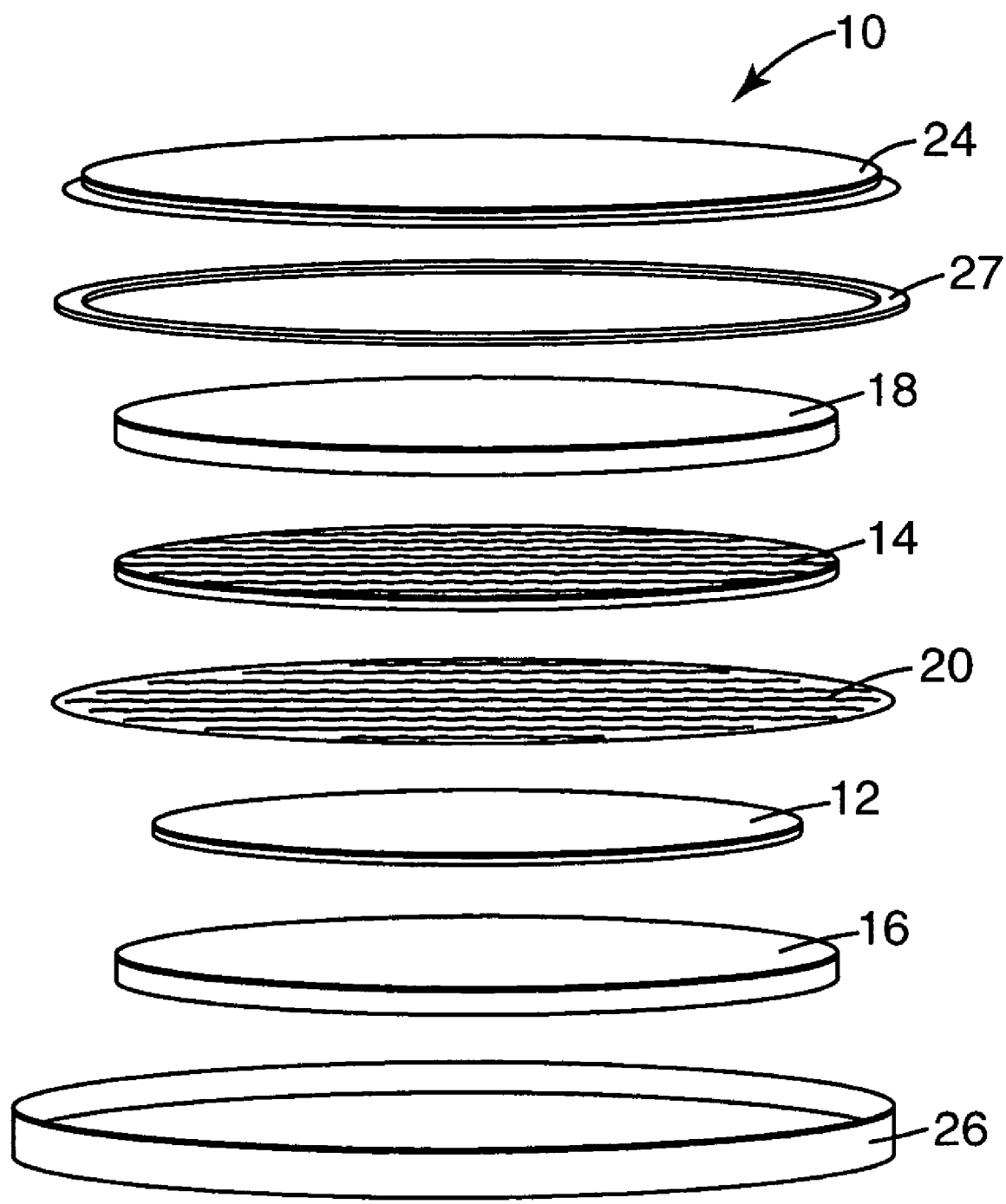
FIG. 9 is an exploded perspective schematic view of an electrochemical cell.

Coin-type test cells were built in 2325 coin cell hardware as described in A. M. Wilson and J. R. Dahn, J. Electrochem. Soc., 142, 326-332 (1995). An exploded perspective schematic view of a 2325 coin cell 10 is shown in FIG. 9. Stainless steel cap 24 and oxidation resistant case 26 contain the cell and serve as the negative and positive terminals respectively. The negative electrode 14 was formed from $Li_{4/3}Ti_{5/3}O_4$ or MCMB coated on copper foil current collector 18 as described above. The positive electrode 12 was formed from $LiFePO_4$ coated on aluminum foil current collector 16 as described above. Separator 20 was formed from CELGARD™ No. 2500 microporous material having a 25 micrometer thickness, and wetted with electrolyte. Gasket 27 provided a seal and separated the two terminals. A tightly squeezed stack was formed when the cell was crimped closed. Except where otherwise noted, all cells were assembled in an approximately "balanced" configuration, that is with the negative electrode capacity equaling the positive electrode capacity. The assembled cells were cycled at 30° C. or 55° C. at "C/5" (five hour charge and five hour discharge) or "C/2" (two hour charge and two hour discharge) rates using a computer-controlled charge-discharge testing unit produced by E-One/Moli Energy. Negative electrodes made from $Li_{4/3}Ti_{5/3}O_4$ and positive electrodes made from $LiFePO_4$ each had a specific capacity of 140 mAh/g. Thus a specific current of 140 mA/g could discharge the fully charged electrodes in one hour, and 140 mA/g represented a "1C" rate for these electrodes. These cells were discharged to 1.0 or 1.3 V and were charged for a fixed capacity or until an upper cutoff of 2.65V was reached. Since $Li_{4/3}Ti_{5/3}O_4$ has a plateau potential near 1.56 V vs. $Li/Li^+$, the cutoff potentials of 1.0, 1.3 and 2.65 V vs. $Li_{4/3}Ti_{5/3}O_4$ correspond to potentials of about 2.56, 2.86 and 4.21 V vs. $Li/Li^+$. Negative electrodes made from MCMB had a specific capacity of 280 mAh/g. Thus a specific current of 280 mA/g could discharge the fully charged electrodes in one hour, and 280 mA/g represented a 1C rate for these MCMB electrodes. Cells using $LiFePO_4$ positive electrodes and MCMB negative electrodes were charged and discharged with C-rates referenced to the positive electrode, but due to the balanced electrode configuration in the cells, the C-rate referenced to the negative electrode was almost the same. The MCMB negative electrode cells were discharged to 2.5 V and charged for a fixed capacity or until an upper cutoff of 4.0 V was reached. Due to the balanced electrode configuration, the MCMB electrode reaches 0.0V vs. $Li/Li^+$ when the $LiFePO_4$ is fully charged and thus the 4.0 V cutoff potential vs. MCMB is approximately 4.0 V vs. $Li/Li^+$.

The results are shown below in Table 1 and in FIG. 1a through FIG. 6.

cells were like those in Example 1 and Comparison Example 1, but employed a more balanced electrode configuration and were cycled at 55° C. The Comparison Example 2 cell (shown in FIG. 2b) did not contain shuttle in its electrolyte. The cell voltage could be increased above 2.4 V during charge. In contrast, the Example 2 cell (shown in FIG. 2a) contained shuttle in its electrolyte and had its voltage clamped at about 2.4 V during overcharge. The shuttle effect was maintained even at 55° C., and the imbalance-induced initial voltage spike seen in FIG. 1a was not present.

FIGS. 3a and 3b show the Example 3 cell and Comparison Example 3 cell charge-discharge cycling behaviors. These cells were like those in Example 2 and Comparison Example 2, but employed a $LiPF_6$-based electrolyte that contained toluene cosolvent and a higher shuttle concentration. The cells were cycled at 30° C. The Comparison Example 3 cell (shown in FIG. 3b) did not contain shuttle in its electrolyte. The cell voltage could be increased above 2.4 V during charge. In contrast, the Example 3 cell (shown in FIG. 3a) contained shuttle in its electrolyte and had its voltage clamped at about 2.4 V during overcharge. The shuttle effect was

TABLE 1

| Example No. or Comparison Example No. | Negative Electrode | Electrolyte | Shuttle Present? (Conc.) | Temp (° C.) | Charge/ Discharge Rate | Positive Electrode Mass (mg) | % over charge |
|---|---|---|---|---|---|---|---|
| 1 | $Li_{4/3}Ti_{5/3}O_4$ | 0.7 M LiBOB EC:DEC 1:2 | Yes (0.088 M) | 30 | C/5 | 10.38 | 150 |
| Comp. Ex. 1 | $Li_{4/3}Ti_{5/3}O_4$ | 0.7 M LiBOB EC:DEC 1:2 | No | 30 | C/5 | 9.62 | No shuttle |
| 2 | $Li_{4/3}Ti_{5/3}O_4$ | 0.7 M LiBOB EC:DEC 1:2 | Yes (0.088 M) | 55 | C/5 | 8.96 | 150 |
| Comp. Ex. 2 | $Li_{4/3}Ti_{5/3}O_4$ | 0.7 M LiBOB EC:DEC 1:2 | No | 55 | C/5 | 8.96 | No shuttle |
| 3 | $Li_{4/3}Ti_{5/3}O_4$ | 1 M $LiPF_6$ PC:DMC:Toluene 1:2:1 | Yes (0.22 M) | 30 | C/5 | 8.96 | 150 |
| Comp. Ex. 3 | $Li_{4/3}Ti_{5/3}O_4$ | 1 M $LiPF_6$ PC:DMC:Toluene 1:2:1 | No | 30 | C/5 | 8.96 | No shuttle |
| 4 | MCMB | 0.7 M LiBOB PC:DMC 1:2 | Yes (0.088 M) | 30 | C/2 | 5.895 | 100 |
| Comp. Ex. 4 | MCMB | 0.7 M LiBOB PC:DMC 1:2 | No | 30 | C/2 | 5.314 | No shuttle |
| 5 | $Li_{4/3}Ti_{5/3}O_4$ | 1 M $LiPF_6$ EC:DEC 1:2 | Yes (0.088 M) | 30 | C/5 | 11.23 | 50 |
| 6 | MCMB | 1 M $LiPF_6$ EC:DEC 1:2 | Yes (0.088 M) | 30 | C/5 | 9.83 | 75 |

Figure 1A:
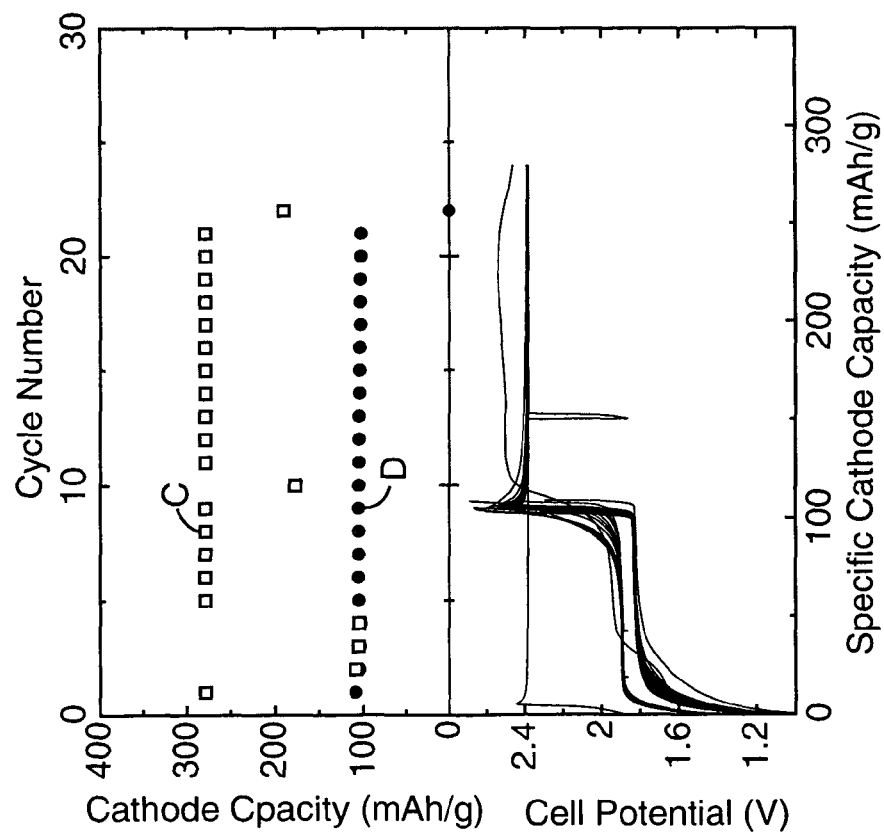
FIG. 1a is a plot showing capacity versus cycle number (top panel) and cell potential versus cathode specific capacity (bottom panel) for the Example 1 cell.

The upper panels in FIGS. 1a and 1b respectively show the Example 1 cell and Comparison Example 1 cell charge (Curve "C") and discharge (Curve "D") cathode capacity during the course of the test. In general, for cells containing an overcharge shuttle, flat and widely-separated C and D curves are desirable. The lower panels respectively show an overlay of the Example 1 cell and Comparison Example 1 cell potential vs. specific cathode capacity during the course of the test. In general, an absence of overshoot (viz., a voltage spike) and a flat plateau (viz, a voltage plot having low or no slope) at the charging voltage are desirable. The Example 1 and Comparison Example 1 cells employed a $Li_{4/3}Ti_{5/3}O_4$ negative electrode, a $LiFePO_4$ positive electrode and a LiBOB-based electrolyte. The cells were cycled at C/5 at 30° C. The Comparison Example 1 cell (shown in FIG. 1b) did not contain shuttle in its electrolyte. The cell voltage increased above 2.4 V during charge. In contrast, the Example 1 cell (shown in FIG. 1a) contained shuttle in its electrolyte and had its voltage clamped at about 2.4 V (evidenced by the flat plateau at 2.4 V in the lower panel of FIG. 1a) during overcharge. At the beginning of the shuttle period, the Example 1 cell potential rose briefly above 2.4 V. This is believed to have been caused by a slight imbalance in the positive and negative electrode capacities. In this case the negative electrode capacity was slightly too small. Nevertheless, a stable shuttle effect was observed over many cycles.

Figure 2B:
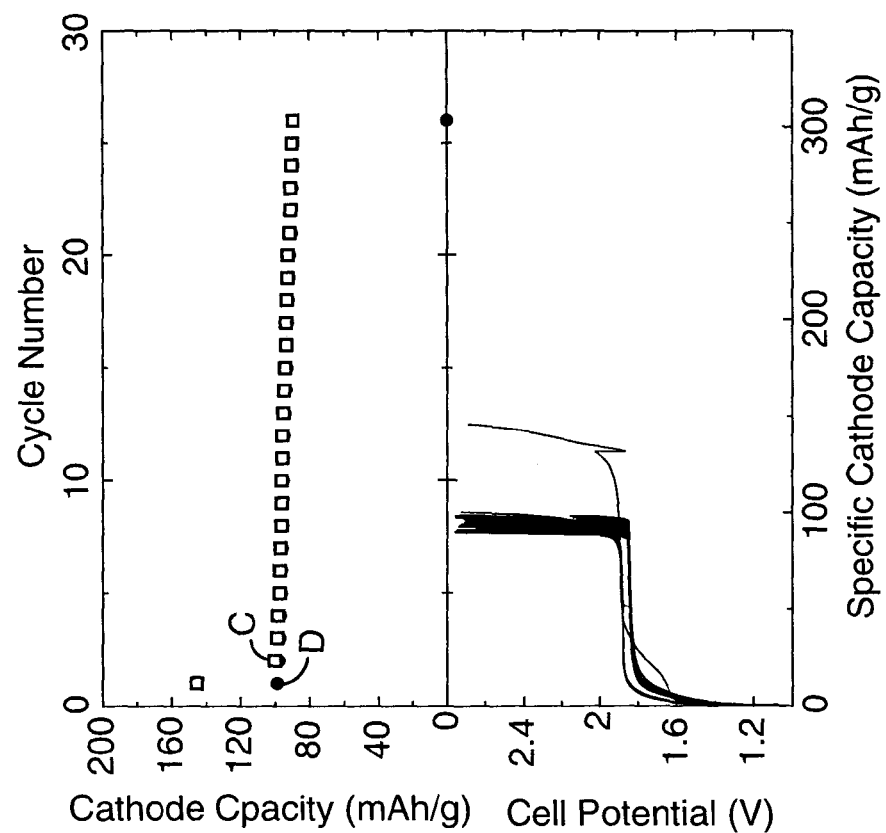
FIG. 2b is a plot showing capacity versus cycle number and cell potential versus cathode specific capacity for the Comparison Example 2 cell.
Figure 2A:
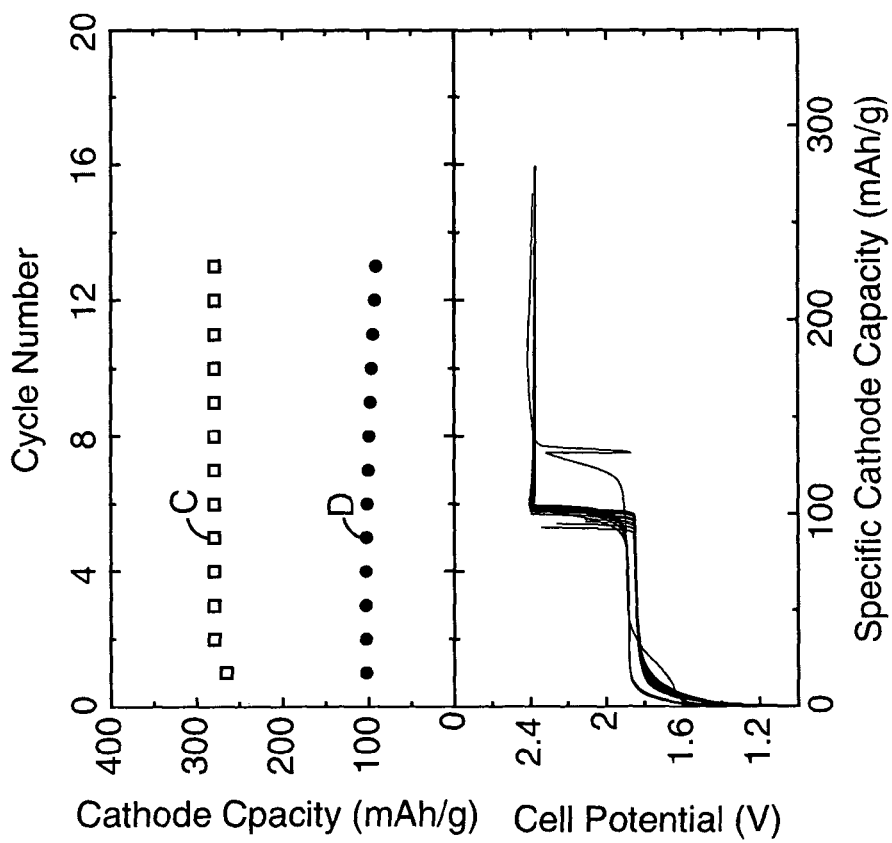
FIG. 2a is a plot showing capacity versus cycle number and cell potential versus cathode specific capacity for the Example 2 cell.
Figure 3C:
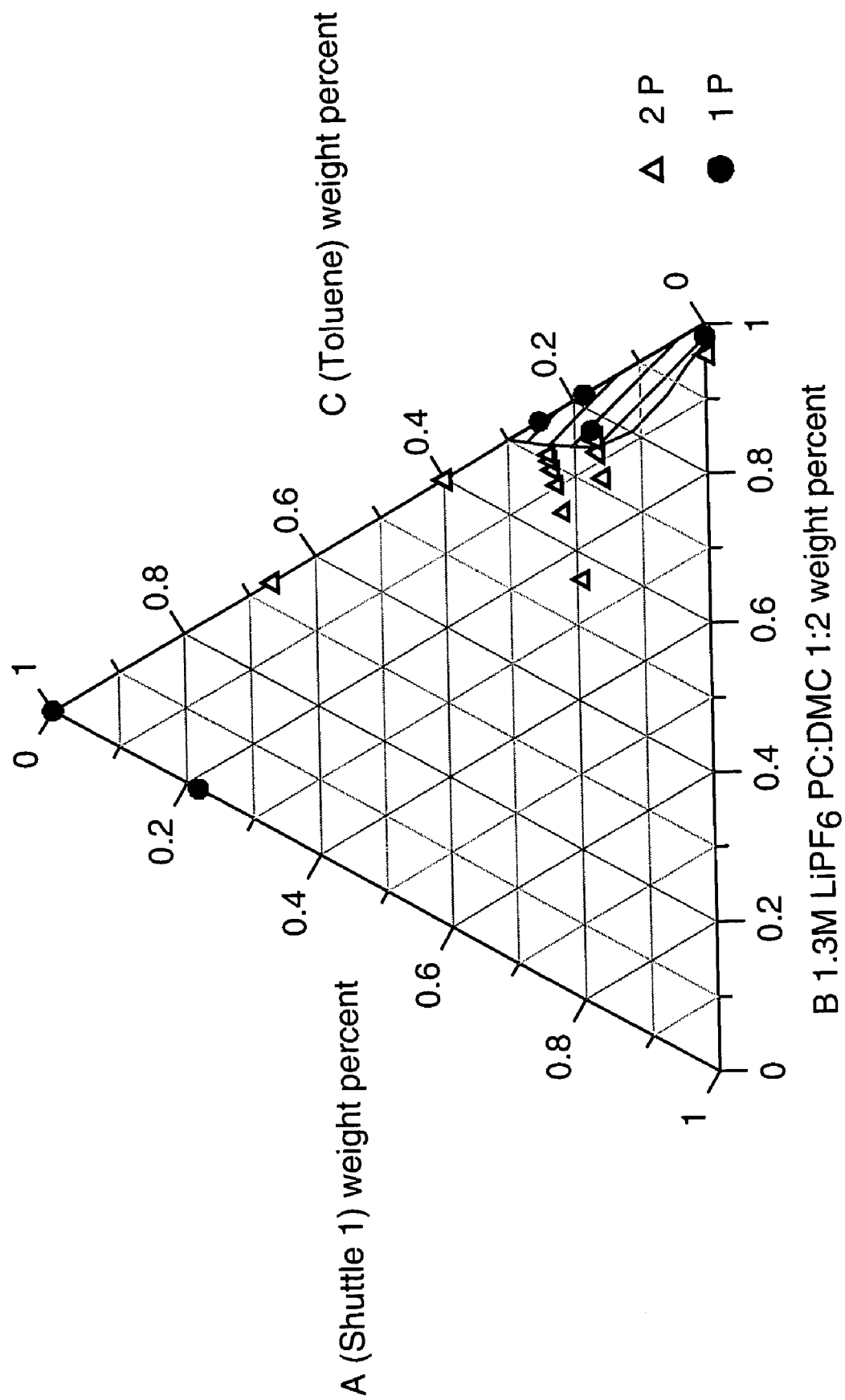
FIG. 3c is a triangular plot showing a single phase region in the Example 3 electrolyte system.

FIGS. 2a and 2b show the Example 2 cell and Comparison Example 2 cell charge-discharge cycling behaviors. These maintained even when toluene was present in the electrolyte, and the 0.22 M shuttle concentration was substantially greater than the approximate 0.09 M maximum room temperature solubility of 2,5-di-tert-butyl-1,4-dimethoxybenzene in the Example 1 and Example 2 electrolyte. FIG. 3c shows in its lower right-hand corner a shaded region of single phase electrolyte systems that result from mixtures of 1.3 M $LiPF_6$ PC:DMC 1:2, toluene and 2,5-di-tert-butyl-1,4-dimethoxybenzene. In this region a toluene addition can improve the solubility of 2,5-di-tert-butyl-1,4-dimethoxybenzene in the disclosed electrolyte.

FIGS. 4a and 4b show the Example 4 cell and Comparison Example 4 cell charge-discharge cycling behaviors. These cells employed a MCMB negative electrode, a $LiFePO_4$ positive electrode and a LiBOB-based electrolyte. The cells were cycled at C/2 at 30° C. The Comparison Example 4 cell (shown in FIG. 4b) did not contain shuttle in its electrolyte. The cell voltage could be increased above 4.0 V during charge. In contrast, the Example 4 cell (shown in FIG. 4a) contained shuttle in its electrolyte and had its voltage clamped at about 3.9 V during overcharge. The shuttle effect was maintained even at C/2 rates.

Figure 5:
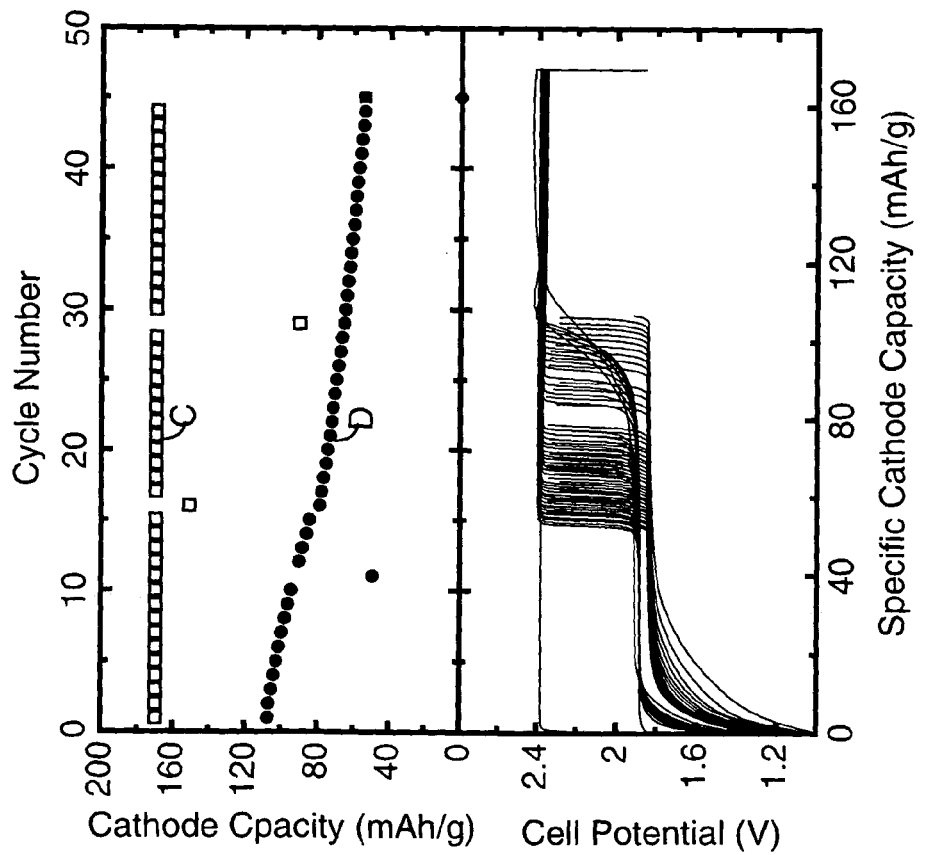
FIG. 5 is a plot showing capacity versus cycle number and cell potential versus cathode specific capacity for the Example 5 cell.

FIG. 5 shows the Example 5 cell's charge-discharge cycling behavior. This cell employed a $Li_{4/3}Ti_{5/3}O_4$ negative electrode, a $LiFePO_4$ positive electrode and a $LiPF_6$-based electrolyte. The cell was cycled at C/5 at 30° C. Although the discharge capacity of the cell decreased with charge-discharge cycle number, the shuttle continued to function properly, by providing a stable charge capacity (upper panel) and a stable shuttle effect as indicated by the extended overcharge plateau at 2.4 V (approx. 3.9 V vs. Li/Li$^+$) in the lower panel.

Figure 6:
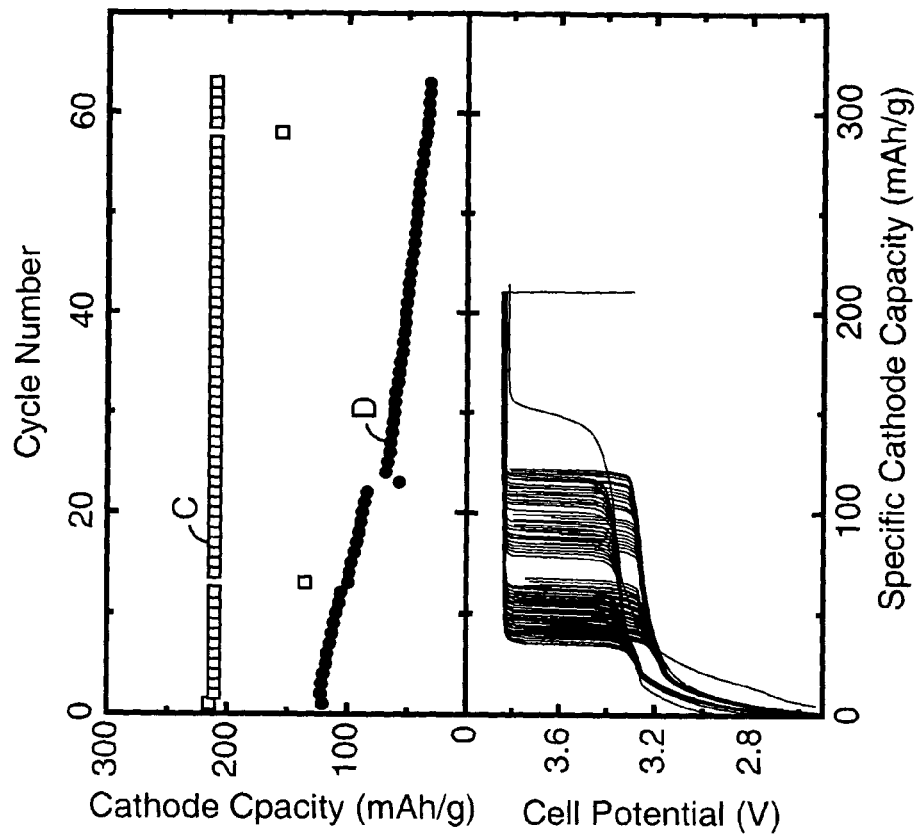
FIG. 6 is a plot showing capacity versus cycle number and cell potential versus cathode specific capacity for the Example 6 cell.

FIG. 6 shows the Example 6 cell's charge-discharge cycling behavior. This cell employed a MCMB negative electrode, a LiFePO$_4$ positive electrode and a LiPF$_6$-based electrolyte. The cell was cycled at C/5 at 30° C. Although the discharge capacity of the cell decreased with charge-discharge cycle number, the shuttle continued to function properly, by providing a stable charge capacity (upper panel) and a stable shuttle effect as indicated by the extended overcharge plateau at approx. 3.9 V vs. Li/Li$^+$ in the lower panel.

Example 7

Figure 7B:
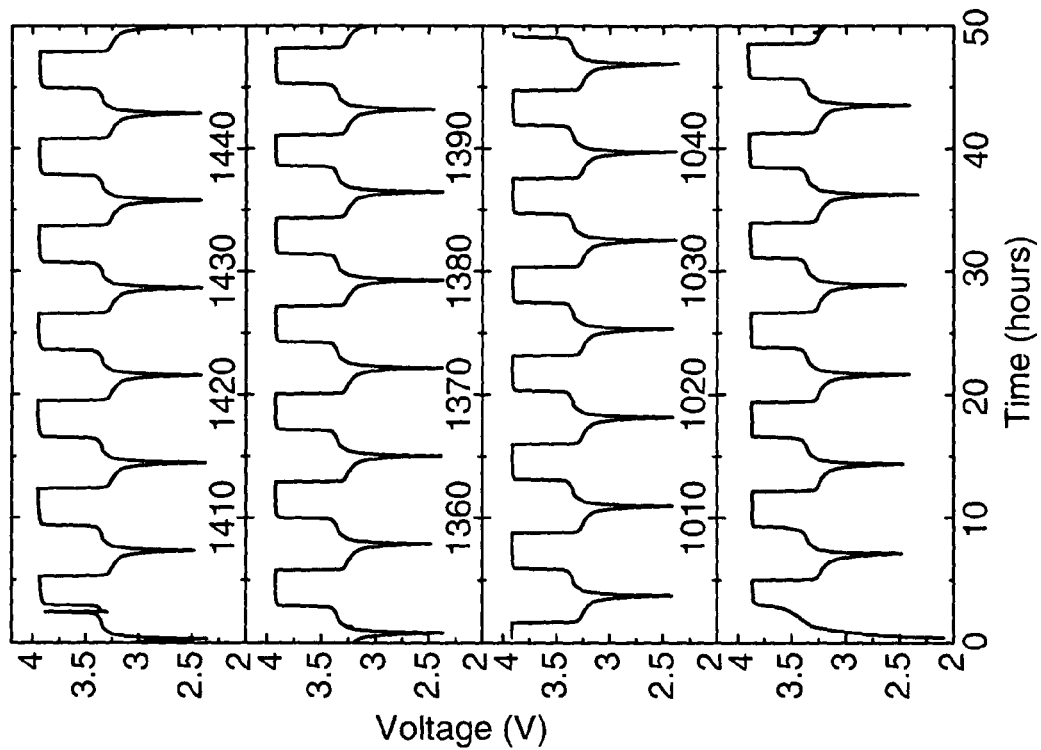
FIG. 7b is a plot showing cell potential during successive charge-discharge cycles for four different time spans in the Example 7 cell charge-discharge test.
Figure 7A:
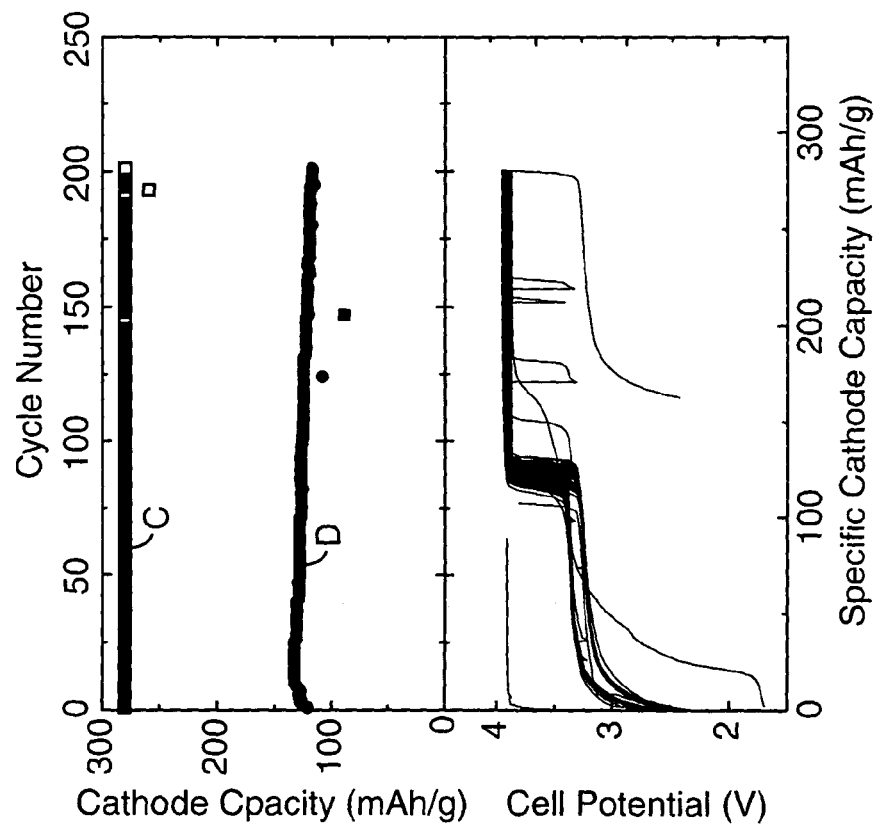
FIG. 7a is a plot showing capacity versus cycle number and cell potential versus cathode specific capacity for the Example 7 cell.

A 2325 coin cell like that made in Example 4 was evaluated using a "C/2.5" (two and one-half hour charge and discharge rate) test cycle. The results are shown in FIG. 7a and FIG. 7b, with FIG. 7b showing cycle-by-cycle cell potentials for four time spans during the course of the test. The shuttle exhibited excellent stability even after 200 cycles, and continued to provide a relatively flat charging voltage plateau even at 1440 hours. Following preparation of FIG. 7a and FIG. 7b, the cell has continued to be monitored. The cell has surpassed 3000 hours of cycling, and the shuttle continues to exhibit excellent stability and provide a relatively flat charging plateau.

Example 8

Figure 8B:
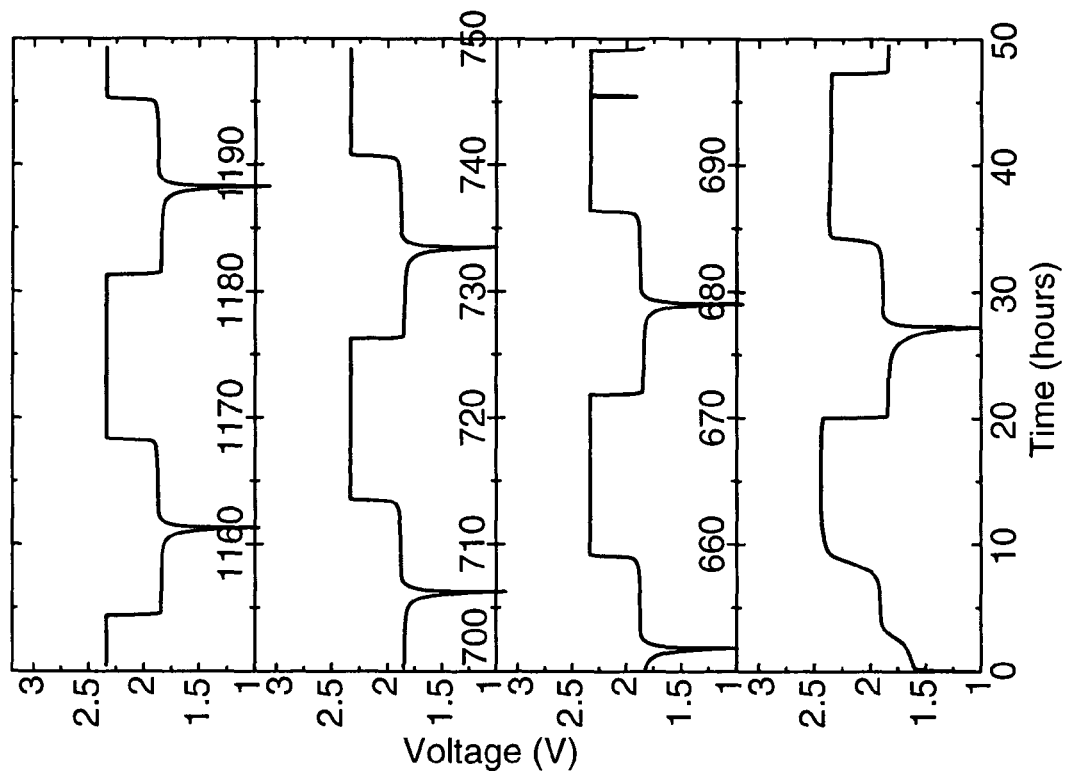
FIG. 8b is a plot showing cell potential during successive charge-discharge cycles for four different time spans in the Example 8 cell charge-discharge test.
Figure 8A:
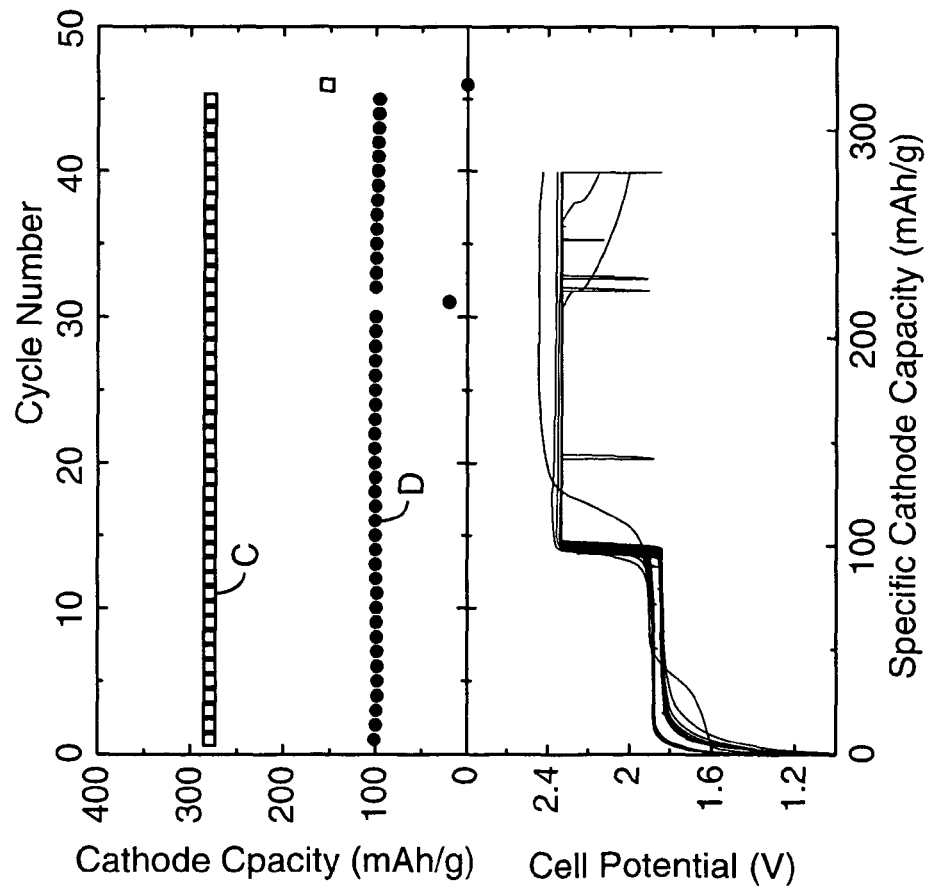
FIG. 8a is a plot showing capacity versus cycle number and cell potential versus cathode specific capacity for the Example 8 cell.

A 2325 coin cell similar to the Example 1 cell was prepared using a two-stage crimping procedure that provided a tighter seal. The cell employed a Li$_{4/3}$Ti$_{5/3}$O$_4$ negative electrode and contained as the electrolyte 0.8 M LiBOB in a 1:2:1:2 molar ratio mixture of PC:DMC:EC:DEC. The cell was subjected to overcharge/discharge testing at 55° C. The results are shown in FIG. 8a and FIG. 8b, and demonstrate excellent shuttle stability after 45 cycles and about 1200 hours.

Examples 9-11 and Comparison Example 5

A variety of shuttle molecules (obtained from Aldrich Chemical Co. and used without further purification) were tested in LiFePO$_4$/graphite and LiFePO$_4$/Li$_{4/3}$Ti$_{5/3}$O$_4$ coin cells. The LiFePO$_4$ was obtained from Phostech Lithium as in Example 1 and the Li$_{4/3}$Ti$_{5/3}$O$_4$ was obtained from NEI Corp. (Piscataway, N.J., USA). The graphite used was mesocarbon microbeads (MCMB) heat treated to near 2650° C. Electrodes were made from the active materials 10% by weight Super S carbon black (MMM Carbon, Belgium) and 10% by weight PVDF binder. LiFePO$_4$ and Li$_{4/3}$Ti$_{5/3}$O$_4$ electrodes were coated on aluminum foil and MCMB electrodes were coated on copper foil. A 20% capacity excess of the negative electrode was used, to ensure that the negative electrode had a stable and known potential versus Li/Li$^+$ when the Li-ion cell reached the fully charged state corresponding to Li$_0$FePO$_4$. The electrolyte was 0.7 M LiBOB in a 1:2:1:2 by volume mixture of PC:DMC:EC:DEC. The shuttle molecule was added in a concentration of 0.1M. Coin cells were charged using currents corresponding to a normal recharge in 10 hours (C/10) to 200% of their normal charge capacity (100% overcharge) or until a specified upper cut-off potential (normally 4.9V versus Li/Li$^+$) was reached, which ever occurred first and tested until the shuttle ceased to function. Four shuttles were employed, namely 1,3,5-tri-t-butyl-2-methoxybenzene (Example 9), 5-t-butyl-1,3-dinitro-2-methoxybenzene (Example 10), 2-t-butyl-4,6-dinitro-5-methylanisole (Example 11) and 4-t-butyl-2,6-diaminoanisole (Comparison Example 10). The coin cell test results are set out below in Table 2:

TABLE 2

| Example No. or Comparison Example No. | Shuttle Molecule | Potential V, Li/Li$^+$ | Cycles |
|---|---|---|---|
| 9 | (structure: 1,3,5-tri-t-butyl-2-methoxybenzene) | 4.4 | 3 |
| 10 | (structure: 5-t-butyl-1,3-dinitro-2-methoxybenzene) | 4.9 | 2 |
| 11 | (structure: 2-t-butyl-4,6-dinitro-5-methylanisole) | 4.9 | 2 |
| Comp. Ex. 5 | (structure: 4-t-butyl-2,6-diaminoanisole) | 4.4 | 0 |

The results in Table 2 show the effect of various substituents. In Comparison Example 10, the number and location of added electron donating amino substituents apparently prevented the substituted anisole from operating as a shuttle in the chosen cell chemistry.

Example 12

Figure 10:
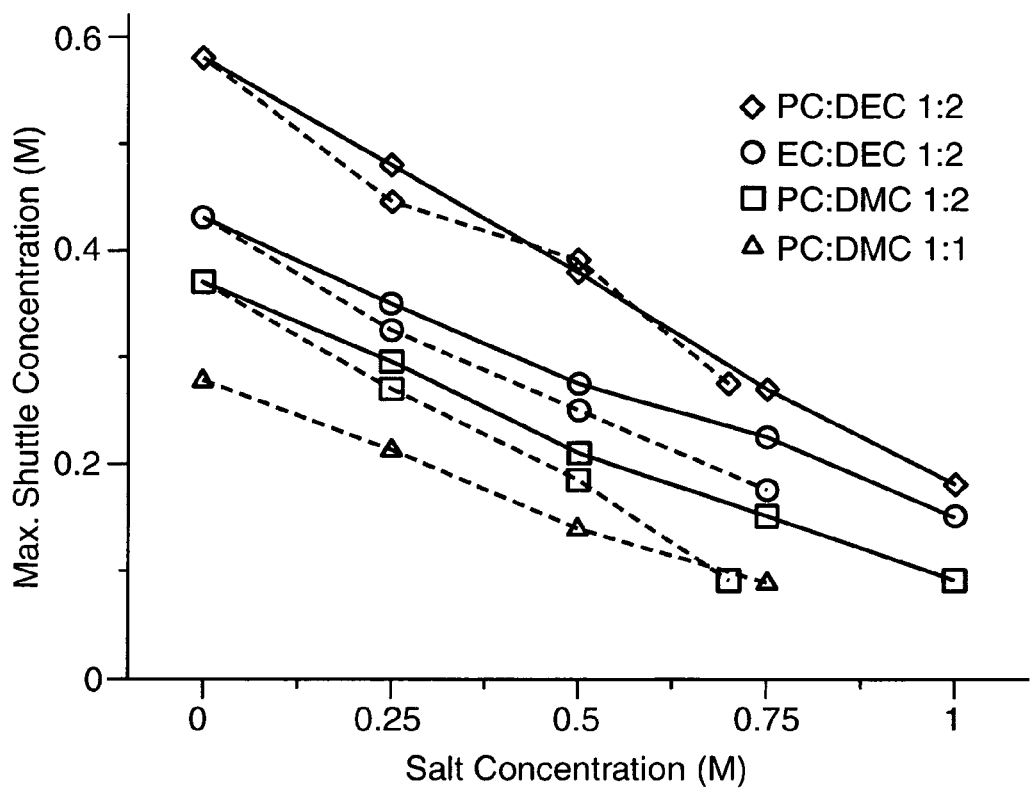
FIG. 10 is a plot showing solubility of the Example 1 shuttle in various electrolyte solutions.

FIG. 10 shows the maximum solubility of 2,5-di-tert-butyl-1,4-dimethoxybenzene in various molarity solutions of LiPF$_6$ or LiBOB lithium salts dissolved in a 1:2 (by volume) mixture of PC:DEC, a 1:2 mixture of EC:DEC, a 1:2 mixture of PC:DMC or a 1:1 mixture of PC:DMC. Solubility limits were determined visually, after extended mixing. FIG. 10 shows that in all cases the shuttle solubility decreased as the lithium salt concentration increased, and that the shuttle solubility did not differ greatly in solutions of LiPF$_6$ or LiBOB having the same molarity.

Figure 11:
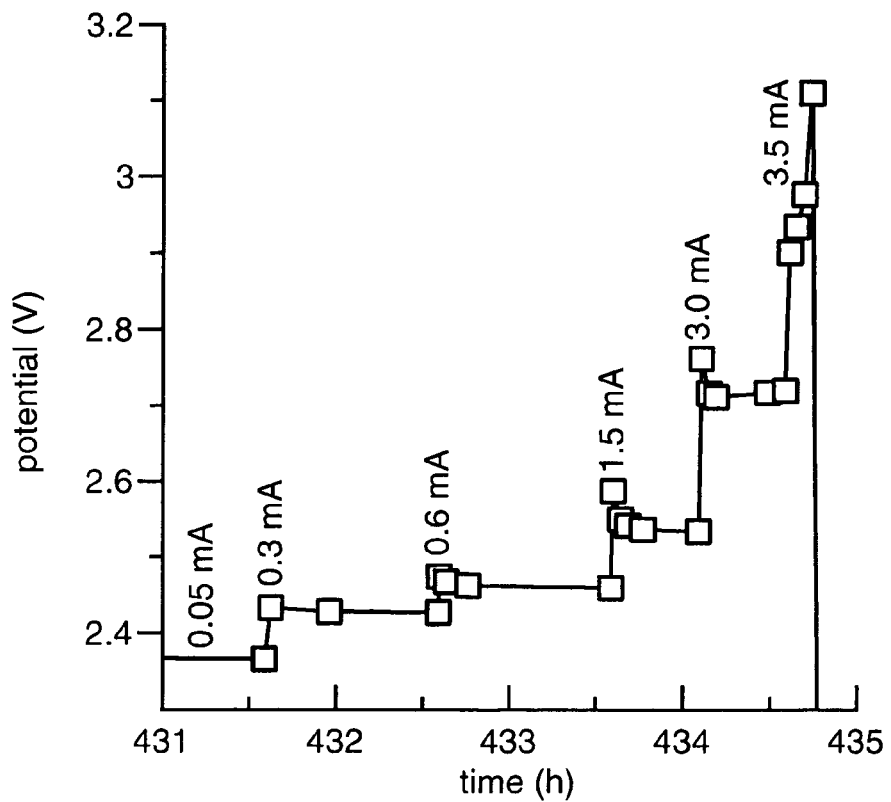
FIG. 11 is a plot showing potential at increasing charge currents for a cell of Example 12.

Further testing was carried out in coin cells made using 0.2 M 2,5-di-tert-butyl-1,4-dimethoxybenzene and 0.5 M LiBOB in 1:2 PC:DEC. The cells were charged to a voltage plateau corresponding to operation of the shuttle (viz., the potential at which the shuttle became oxidized at the LiFePO$_4$ positive electrode, in this case a potential of about 3.9 V vs Li/Li$^+$) and then the current was sequentially increased. FIG. 11 shows that I$_{max}$ (see Formula 1, above) was between 3.0 mA and 3.5 mA. For this cell the shuttle was singly ionized, the initially estimated electrode area was 1.3 cm$^2$ and the initially estimated electrode spacing was defined by the 25 µm separator. Based on measurements of the shuttle potential versus applied current, the effective diffusion constant D was estimated to be about 7×10$^{-7}$ cm$^2$/sec, and the maximum current density carried by the shuttle was estimated to be about 2.3 mA/cm$^2$. Using cyclic voltammetry, the shuttle diffusion constant was determined to be 1.6×10$^{-6}$ cm$^2$/sec. The estimated and actual shuttle diffusion constants can be reconciled by recognizing that the separator is not 100% porous and that its pores exhibit toruosity (viz., the pores do not provide a straight line path through the separator). Thus, the effective area was less than 1.3 cm$^2$ and the effective length was greater than 25 µm.

Figure 12:
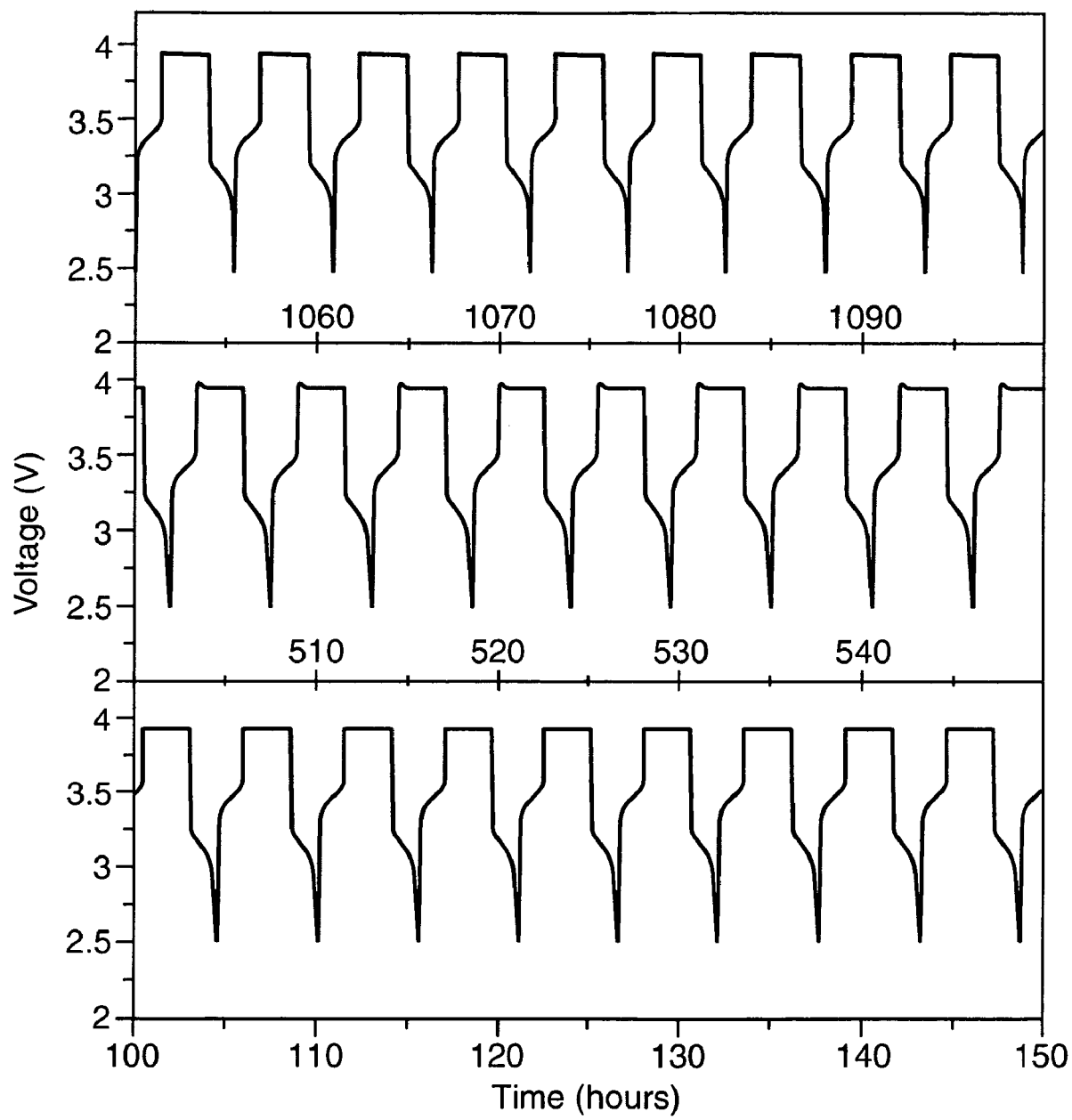
FIG. 12 and FIG. 13 are plots showing discharge capacity versus cycle number for a cell of Example 12.
Figure 13:
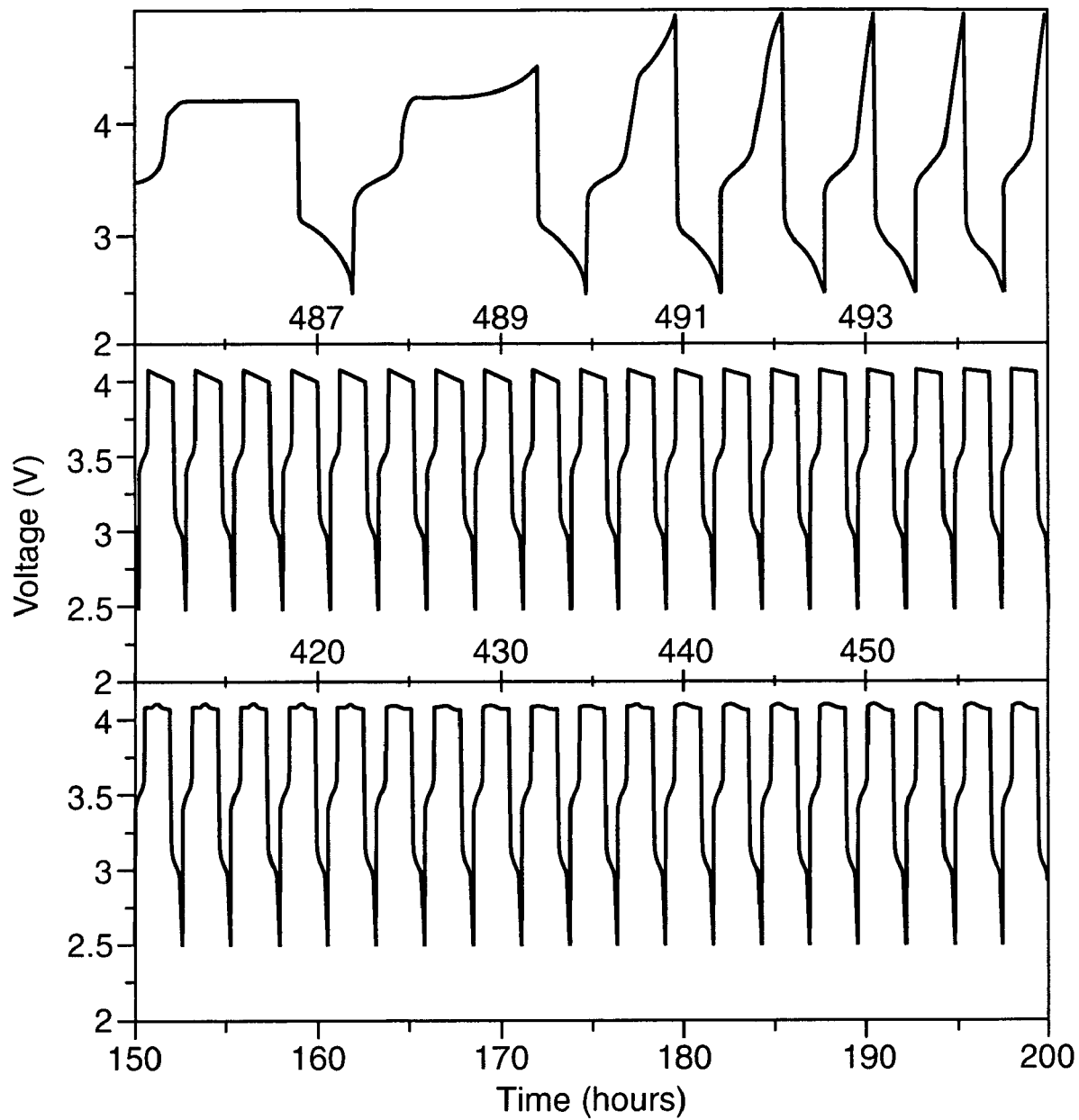

Further testing was carried out to evaluate currents up to ⅓ of I$_{max}$ in extended shuttle-protected overcharge tests. FIG. 12 shows the potential versus time for a LiFePO$_4$/graphite cell containing 0.2 M 2,5-di-tert-butyl-1,4-dimethoxybenzene and 0.5 M LiBOB in 1:2 PC:DEC during extended cycling with 100% overcharge during each cycle. The shuttle plateau is near 3.9 V because the graphite electrode is near 0 V vs Li/Li$^+$ when the Li-ion coin cell is fully charged. The charging current was 0.55 mA, which corresponds to about a C/2-rate for the electrodes of this cell. The shuttle continues to perform well after 200 charge discharge cycles. FIG. 13 shows the potential versus time at a 1.1 mA charging current, which corresponds to about C-rate for the electrodes of this cell. In this case, the shuttle was able to protect against overcharge for about 190 cycles, followed by disappearance of the shuttle effect over the next few cycles. Near the end of overcharge protection, the shuttle plateau crept up and then eventually rapidly increased. When the applied current in was reduced to C/10, the shuttle effect reappeared, indicating that a significant concentration of shuttle molecule still remained in the cell. The loss of shuttle effect at high C rates may have been due to the Li$_{4/3}$Ti$_{5/3}$O$_4$ negative electrode dropping below its plateau potential (1.55 V) before reaching the fully discharged state.

The heat produced during shuttle-protected overcharge or overdischarge was evaluated using microcalorimetry and found to be related to the power (I×V where I is current and V is voltage) supplied to the cell by the current supply. Using known thermal parameters for 18650 cells, it was estimated that charging at currents greater than about 400 mA during shuttle-protected overcharge would result in cell temperatures above 50° C. unless the cell is actively cooled.

Figure 14:
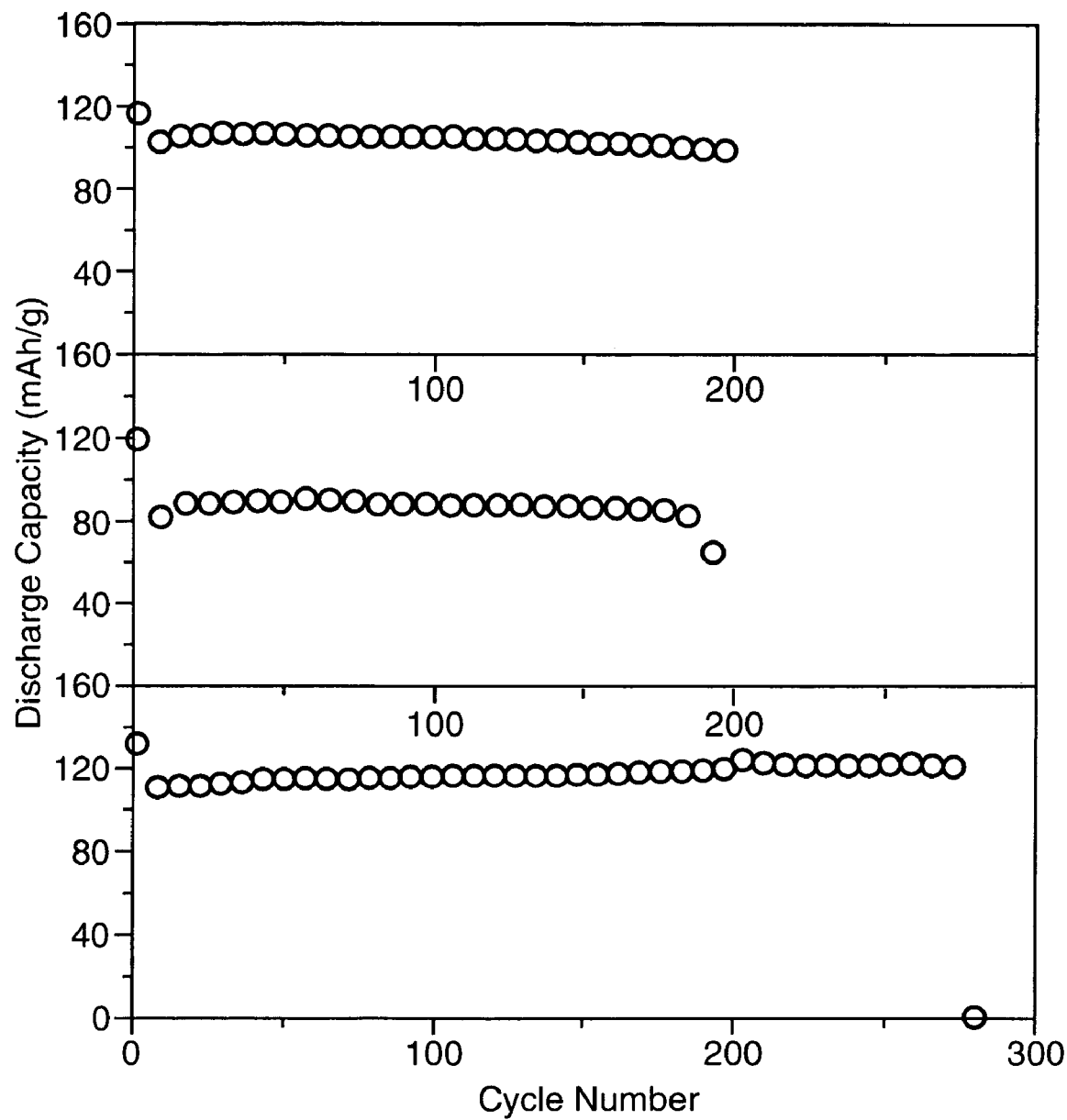
FIG. 14 is a plot showing capacity versus cycle number for cells of Example 12.

FIG. 14 shows the discharge capacity versus cycle number for the cell shown in FIG. 12 and FIG. 13 at the C/2 and C charging rates, and for a similar cell made using a Li$_{4/3}$Ti$_{5/3}$O$_4$ electrode. In each case very good capacity retention was observed.

A number of embodiments of the invention have been described. Nevertheless, it will be understood that various modifications may be made without departing from the spirit and scope of the invention. Accordingly, other embodiments are within the scope of the following claims.

We claim:

1. A lithium ion cell electrolyte comprising a charge carrying medium, lithium salt and cyclable redox chemical shuttle comprising 2,5-di-tert-butyl-1,4-dimethoxybenzene.

2. An electrolyte according to claim 1 wherein the charge carrying medium comprises ethylene carbonate, propylene carbonate, dimethyl carbonate, diethyl carbonate, dimethoxyethane or combination thereof and the lithium salt comprises LiPF$_6$, lithium bis(oxalato)borate or combination thereof.

3. An electrolyte according to claim 1 wherein the redox chemical shuttle has an electrochemical potential from about 3.7 to about 4.7 V vs. Li/Li$^+$.

4. An electrolyte according to claim 1 wherein the redox chemical shuttle provides overcharge protection in a lithium-ion cell after at least 20 charge-discharge cycles at a charging voltage sufficient to oxidize the shuttle to its radical cation and an overcharge charge flow equivalent to 100% of the cell capacity during each cycle.

5. An electrolyte according to claim 1 wherein the redox chemical shuttle can provide overcharge protection in a lithium-ion cell after at least 100 charge-discharge cycles at a charging voltage sufficient to oxidize the shuttle to its radical cation and an overcharge charge flow equivalent to 100% of the cell capacity during each cycle.

6. A rechargeable lithium-ion cell comprising a negative electrode; positive electrode; and an electrolyte comprising charge carrying medium, lithium salt and cyclable redox chemical shuttle comprising an aromatic compound substituted with at least one tertiary carbon organic group and at least one alkoxy group and having an electrochemical potential vs. Li/Li$^+$ that is greater than that of the positive electrode material.

7. A rechargeable lithium-ion cell according to claim 6 wherein the negative electrode comprises graphite or Li$_{4/3}$Ti$_{5/3}$O$_4$ and the positive electrode comprises LiFePO$_4$, LiMnPO$_4$ or LiMn$_2$O$_4$.

8. A rechargeable lithium-ion cell according to claim 6 wherein the aromatic compound has a single organic ring.

9. A rechargeable lithium-ion cell according to claim 6 wherein the aromatic compound is substituted with at least two tertiary carbon groups and at least two alkoxy groups, each tertiary carbon group independently having up to 12 carbon atoms and each alkoxy group independently having up to 10 carbon atoms.

10. A rechargeable lithium-ion cell according to claim 6 wherein the aromatic compound comprises 2-tert-butyl-anisole, 3-tert-butyl-anisole, 4-tert-butyl-anisole, 1-nitro-3-tert-butyl-2-methoxybenzene, 1-cyano-3-tert-butyl-2-methoxybenzene, 1,4-di-tert-butyl-2-methoxybenzene, 5-tert-butyl-1,3-dinitro-2-methoxybenzene, 1,3,5-tri-tert-butyl-2-methoxybenzene, 2-tert-pentyl-anisole, 2-tert-butyl-1,4-dimethoxybenzene, 2,3-di-tert-butyl-1,4-dimethoxybenzene, 2,5-di-tert-butyl-1,4-dimethoxybenzene, 2,5-di-tert-pentyl-1,4-dimethoxybenzene, 2,5-di-tert-butyl-3,6-di-nitro-1,4-dimethoxybenzene, 2,5-di-tert-butyl-3,6-di-cyano-1,4-dimethoxybenzene, 2,5-di-tert-butyl-1,4-diethoxybenzene, 4-tert-butyl-1,2-dimethoxybenzene, 4,5-di-tert-butyl-1,2-dimethoxybenzene, 4,5-di-tert-pentyl-1,2-dimethoxybenzene, 4,5-di-tert-butyl-1,2-diethoxybenzene or 4,8-di-tert-butyl-1,5-dimethoxynaphthalene.

11. A rechargeable lithium-ion cell according to claim 6 wherein the aromatic compound comprises 2,5-di-tert-butyl-1,4-dimethoxybenzene.

12. A rechargeable lithium-ion cell according to claim 6 wherein the positive electrode has a recharge plateau and the redox chemical shuttle has a redox potential about 0.3 to about 0.6 V above the positive electrode recharge plateau.

13. A rechargeable lithium-ion cell according to claim 6 wherein the redox chemical shuttle can provide overcharge protection in a lithium-ion cell after at least 100 charge-discharge cycles at a charging voltage sufficient to oxidize the shuttle to its radical cation and an overcharge charge flow equivalent to 100% of the cell capacity during each cycle.

14. An electrical or electronic device comprising a rechargeable lithium-ion cell according to claim 6 without electronic overcharge protection circuitry.

15. A rechargeable lithium-ion cell comprising a negative electrode, positive electrode comprising $LiFePO_4$, electrolyte and a cyclable redox chemical shuttle comprising an aromatic compound substituted with at least one tertiary carbon organic group and at least one alkoxy group and having an electrochemical potential vs. $Li/Li^+$ that is greater than that of $LiFePO_4$.

16. A rechargeable lithium-ion cell according to claim 15 wherein the positive electrode has a recharge plateau and the redox chemical shuttle has a redox potential about 0.3 to about 0.6 V above the positive electrode recharge plateau.

17. A rechargeable lithium-ion cell according to claim 15 wherein the redox chemical shuttle comprises 2,5-di-tert-butyl-1,4-dimethoxybenzene.

* * * * *